United States Patent
Krahenbuhl et al.

(10) Patent No.: US 10,042,480 B2
(45) Date of Patent: Aug. 7, 2018

(54) APPARATUSES, METHODS, AND SYSTEMS FOR AN ELECTRONIC DEVICE WITH A DETACHABLE USER INPUT ATTACHMENT

(75) Inventors: John Henry Krahenbuhl, McHenry, IL (US); Louis Jerome Lundell, Buffalo Grove, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2470 days.

(21) Appl. No.: 12/756,583

(22) Filed: Apr. 8, 2010

(65) Prior Publication Data

US 2011/0248947 A1    Oct. 13, 2011

(51) Int. Cl.
G06F 3/045    (2006.01)
G06F 3/044    (2006.01)
G06F 1/16     (2006.01)
G06F 3/046    (2006.01)

(52) U.S. Cl.
CPC ............ *G06F 3/044* (2013.01); *G06F 1/1626* (2013.01); *G06F 1/1643* (2013.01); *G06F 1/1671* (2013.01); *G06F 1/1684* (2013.01); *G06F 3/046* (2013.01)

(58) Field of Classification Search
CPC .... G06F 1/1626; G06F 1/1643; G06F 1/1684; G06F 1/1632; G06F 1/1671; G06F 3/0416; G06F 3/044; G06F 3/046; G06F 3/0488
USPC ................................ 345/173–183; 178/18.03
See application file for complete search history.

(56) References Cited

U.S. PATENT DOCUMENTS

| | | |
|---|---|---|
| 5,311,175 A | 5/1994 | Waldman |
| 5,584,054 A | 12/1996 | Tyneski et al. |
| 5,694,150 A | 12/1997 | Sigona et al. |
| 5,715,524 A | 2/1998 | Jembhekar et al. |
| 5,742,894 A | 4/1998 | Jembhekar et al. |
| 5,854,624 A | 12/1998 | Grant |
| 6,198,474 B1 | 3/2001 | Roylance |

(Continued)

FOREIGN PATENT DOCUMENTS

| | | |
|---|---|---|
| EP | 1569077 A1 | 8/2005 |
| WO | 2003021922 A1 | 3/2003 |

OTHER PUBLICATIONS

Previl, Daniel "Notice of Allowance", U.S. Appl. No. 12/756,509, filed Apr. 8, 2010; dated Jul. 18, 2012.

(Continued)

*Primary Examiner* — Insa Sadio
(74) *Attorney, Agent, or Firm* — Shumaker & Sieffert, P.A.

(57) ABSTRACT

An electronic device (100) is configured to be operable with the user input attachment (102) so as to provide a user with the option of using a touch sensitive display (101) alone, or in conjunction with the control device or keypad having physical keys to enhance the tactile user experience. The electronic device (100) includes a touch sensitive display (101) and the controller (104) it is operable with a touch sensitive display (101). When the user input attachment (102) is coupled to the touch sensitive display (101), and identification module (106) is configured to identify the user input attachment (102) by way of a temporal signature signal (110). Once identified, and adaptation module (107) is configured to reconfigure the electronic device (100) in response to the user input attachment (102) being attached.

20 Claims, 19 Drawing Sheets

(56) References Cited

U.S. PATENT DOCUMENTS

| | | | |
|---|---|---|---|
| 6,223,233 B1 | 4/2001 | Kavanaugh et al. | |
| 6,271,835 B1 | 8/2001 | Hoeksma | |
| 6,729,547 B1 | 5/2004 | Charlier et al. | |
| 6,747,578 B1 | 6/2004 | Lam et al. | |
| 7,057,579 B2 | 6/2006 | Hanson et al. | |
| 7,315,260 B1 | 1/2008 | Lam et al. | |
| 2002/0050983 A1* | 5/2002 | Liu et al. | 345/173 |
| 2003/0016985 A1* | 1/2003 | Patel | 400/489 |
| 2003/0235452 A1 | 12/2003 | Kraus et al. | |
| 2004/0095333 A1* | 5/2004 | Morag et al. | 345/173 |
| 2005/0118705 A1* | 6/2005 | Rabbitt et al. | 435/287.1 |
| 2006/0055314 A1* | 3/2006 | Nakamura et al. | 313/500 |
| 2006/0256090 A1* | 11/2006 | Huppi | 345/173 |
| 2009/0251434 A1* | 10/2009 | Rimon et al. | 345/173 |
| 2009/0272639 A1* | 11/2009 | Mittleman et al. | 200/345 |
| 2009/0315851 A1* | 12/2009 | Hotelling et al. | 345/173 |
| 2010/0081505 A1 | 4/2010 | Alten et al. | |

OTHER PUBLICATIONS

Patent Cooperation Treaty, "PCT Search Report and Written Opinion of the International Searching Authority" for International Application No. PCT/US2011/028423, dated Dec. 29, 2011, 10 pages.

Response to Examination Report of European Application No. 11712087.3, filed Sep. 25, 2014, 21 pages.

Mobilemechatronics, "iTwingle Keyboard", http://www.youtube.com/watch?v=Kfe3Hlwv2gg&feature=player_embedded, See also, www.mobilemechatronics.com,(Sep. 17, 2009).

U.S. Appl. No. 12/570,140, Dickinson et al., filed Sep. 30, 2009.

\* cited by examiner

APPARATUSES, METHODS, AND SYSTEMS FOR AN ELECTRONIC DEVICE WITH A DETACHABLE USER INPUT ATTACHMENT

CROSS REFERENCE TO PRIOR APPLICATIONS

This application is related to commonly-assigned, U.S. patent application Ser. No. 12/570,140 (now U.S. Pat. No. 8,514,187), entitled "Methods and Apparatus for Distinguishing Between Touch System Manipulators," filed Sep. 30, 2009, with Timothy Dickinson and William Alberth inventors, which is incorporated herein by reference for all purposes. This application is related to commonly-assigned, U.S. patent application Ser. No. 12/756,509 (now U.S. Pat. No. 8,310,351), entitled "Apparatuses, Methods, and Systems for an Electronic Device with a Detachable User Input Attachment," filed concurrently with this application, John Krahenbuhl, Louis Lundell, and Jiri Slaby, inventors, which is incorporated herein by reference for all purposes.

BACKGROUND

Technical Field

This invention relates generally to a method and system for using a user input attachment that can be attachable to a touch sensitive display or surface in an electronic device, either by a user or by a manufacturer at a point of sale, and more particularly to methods and systems for using a user input attachment having a temporal identification signature that is operable with an electromagnetic sensor in touch sensitive surface or display.

Background Art

"Intelligent" electronic devices are becoming more and more prevalent in today's society. For example, not too long ago mobile telephones were simplistic devices with 12-key keypad that only made telephone calls. Today, "smart" phones, personal digital assistants, and other portable electronic devices are configured not only to make telephone calls, but also to manage address books, maintain calendars, playing music and video, display pictures, and surf the web.

As the capabilities of these electronic devices have progressed, so too have their user interfaces. Prior keypads having a limited number of keys have given way to sophisticated user input devices such as touch sensitive screens or touch sensitive pads. Touch sensitive systems, including touch sensitive displays, touch sensitive pads, and the like, include sensors for detecting the presence of an object such as a finger or stylus. By placing the object on the touch sensitive system, the user can manipulate and control the electronic device without the need for a physical keypad.

One advantage associated with these touch sensitive systems is that the user interface can be configured to change input modes. In one application, for example, the user interface may be configured as a music player (with play, pause, fast-forward, and rewind keys), while in another application the same user interface can be reconfigured as a QWERTY keyboard.

One drawback associated with these touch sensitive systems concerns the user experience. Humans often prefer validation of control actions with feedback. In the environment of electronic device, this feedback is frequently expected to be tactile, visual, and audible. Said differently, when the user actuates a "button" on electronic device such as a smart phone, they generally prefer to know that the button has been pressed by receiving some tactile feedback as well as visual and audible feedback. One shortcoming of touch sensitive displays is that, being devoid of physical buttons, a user is unable to feel the outlines of a key or feel a key "push back" against their finger upon actuation and/or release. Thus, devices having touch sensitive displays, and with few or no buttons, can deliver a less than optimal experience.

Another shortcoming with touch sensitive devices, is that the virtual keys presented thereon can be small. Quite frequently, a user intending to hit a virtual Q-key on a QWERTY keyboard will hit a virtual W-key or vice versa. As the user is unable to determine by touch that their finger is actually on the virtual key, typographical errors can result. In short, user accuracy can be compromised.

There is thus a need for an improved electronic device offering the flexibility of the touch sensitive display, yet that addresses the aforementioned issues.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
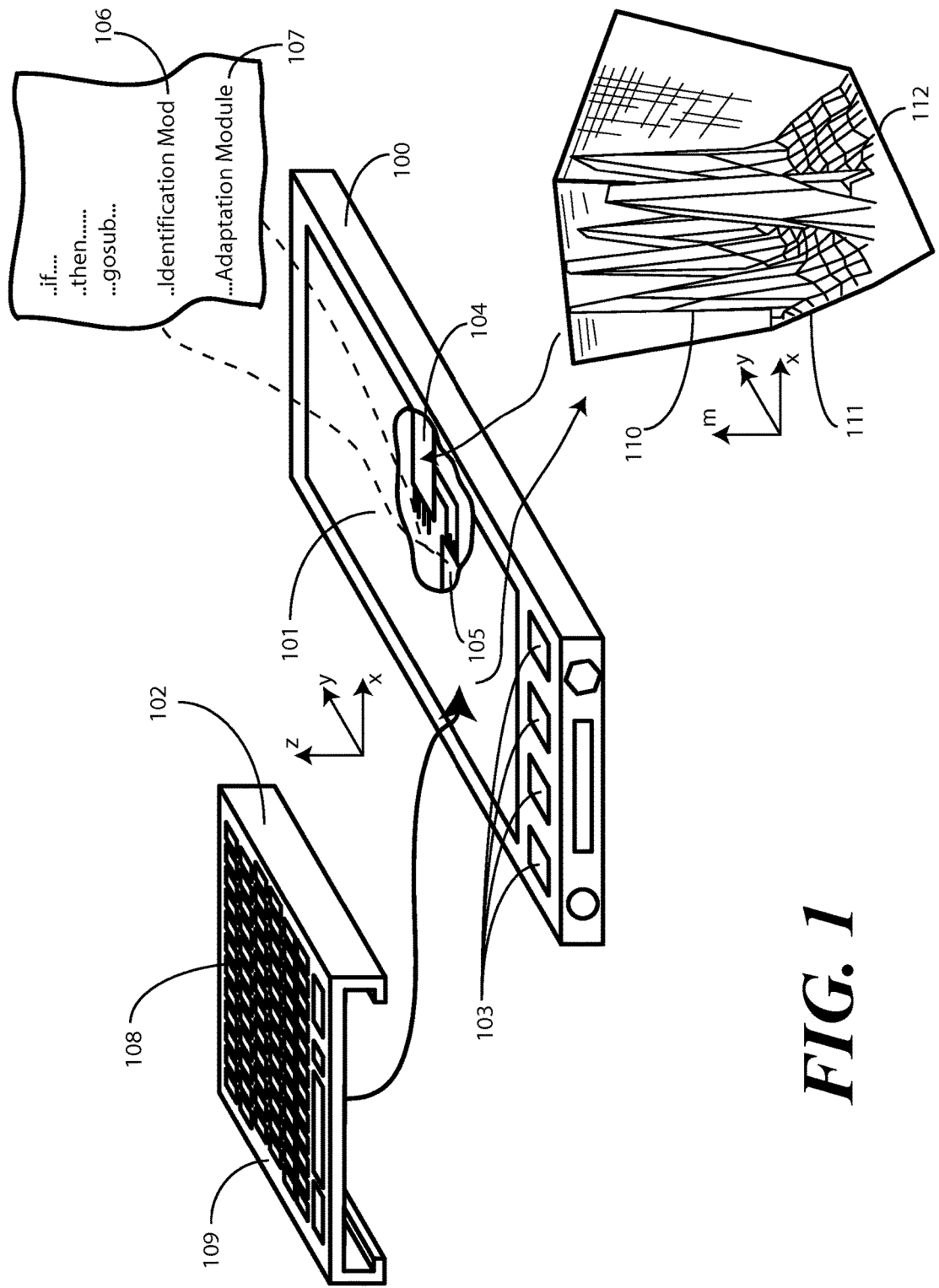
FIG. 1 illustrates one sample electronic device having a touch sensitive display with a user input attachment in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF PREFERRED EMBODIMENTS

Embodiments of the present invention provide an electronic device and an attachable user input attachment. The module may be configured as a detachable user input accessory or may be intended for permanent attachment to the electronic device.

In one embodiment, the electronic device is equipped with a touch-sensitive surface, such as a touch screen or a touchpad, which creates and monitors surface electromagnetic fields. In one embodiment, the touch-sensitive surface includes a capacitive field sensor. In another embodiment, the touch sensitive surface includes a magnetic field sensor.

The user input attachment can be configured to be coupled to the touch-sensitive surface and optionally can be configured to be selectively removed from the touch-sensitive surface. The user input attachment can be configured with one or more tactile keys so as to function as a keypad and/or provide tactile, mechanical feedback when a key is depressed. Optionally, other control devices such as sliders, switches, toggle switches, joysticks and the like can be included in the user input attachment.

A controller, which is operable with the touch-sensitive surface, includes operating modules that are configured to, in one embodiment, both identify the type or configuration of the user input attachment and to adapt the operating mode of the electronic device in response to the identification of the attachment. In one embodiment, when the user input device is coupled to the touch sensitive surface, the user input attachment delivers a temporal signature signal to the electronic device via the capacitive field sensor of the touch-sensitive surface. In one embodiment, the temporal signature signal includes characteristic amplitude, surface area, and time-based signature. An identification module, which is operable with the controller, is configured to identify the user input attachment from the temporal signature signal. Upon identification, an adaptation module is then configured to reconfigure the electronic device in response to this identification.

In one embodiment, when the user input attachment is initially attached to the touch sensitive surface, the identification module analyzes a temporal signature signal detected by the electromagnetic field sensor of the touch sensitive surface in response to one or more conductive pads on the user input attachment being located within the electromagnetic field generated by the touch sensitive display. The temporal signature signal can include characteristics such as a signal amplitude, a signal surface area, a characteristic decay, a characteristic slope, or a characteristic change in slope. From the temporal signal created by the conductive pads and optional non-active (non-powered) components such as inductors, capacitors, and resistors (which might not be discrete components) configured in a second order circuit, the identification module detects the presence of the user input attachment. In one embodiment, this detection can include an analysis of the location or configuration of the conductive pads as well, which may indicate the location and orientation of the user input attachment. The identification module then relays to the adaptation module the identity, optionally the location or orientation, and in one embodiment the physical configuration, i.e., the physical characteristics of the conductive pads, such as shape, size, number, and the like, or optionally the physical configuration of the user input attachment, including number of keys, types of keys, placement of keys, and so forth, of the attachment and/or the conductive pads thereon for the user input attachment.

Optionally, the identification module may notify other electronic device components as well. For example, in one embodiment the identification module can inform a display manager or display driver of the type of user input attachment that has been detected and, optionally, its location and orientation. In one embodiment, the identification module may notify device feedback control systems, such as a haptic subsystem configured to deliver tactile feedback in accordance with user preferences, sensitivities, predefined display or touch-input regions, and so forth, as to the type, orientation, physical configuration, or location of a user input attachment that is coupled to the touch sensitive surface.

As noted above, in one embodiment, a controller employs an adaptation module to reconfigure the electronic device upon the user input attachment being attached and identified. This reconfiguration can include optimization of data presentation on a display such as a touch-sensitive display. Examples of optimization can include scaling a visible area of the touch sensitive display such the data is presented about the user input attachment installed on the touch screen rather than hidden beneath any opaque portions of the user input attachment. The adaptation module may make additional changes associated with device performance parameters and user preferences. Other reconfigurations may also be made, such as reconfiguration of the illumination layer of a touch sensitive display. For example the illumination layer can be caused to increase illumination or decrease illumination (on the display as a whole or on selected portions of the display), thereby improving the visibility of the display and/or keys on the user input attachment, based upon environmental surroundings or power saving requirements.

Illustrating by way of example, the user input attachment is configured as a QWERTY keyboard. When this user input attachment is coupled to a touch sensitive surface of the electronic device, the characteristic temporal signature signal allows the controller to identify (a) the QWERTY keyboard has been attached and (b) the location and orientation of the QWERTY keyboard. The adaptation module then configures the electronic device to receive QWERTY keyboard data through conductive pads disposed on the underside or other surfaces of the user input attachment. In one embodiment, the adaptation module is configured to reconfigure the electronic device based upon the identification of the coupled QWERTY keyboard attachment and user preferences stored in a memory within the electronic device.

In such a configuration, the user preferences employed by the adaptation module, combined with the potential detachability of the user input attachment (and possible replacement with a different user input attachment), working in conjunction with the tactile response delivered by the keys of the user input attachment, all form a user experience that is difficult to match with a planar touch sensitive surface alone.

In one embodiment, the user input attachment is configured as a keyboard that delivers signals corresponding to user actuation of components such as keys without the need for physical, electromechanical connections such as plugs, ports, connectors, or receptacles, such as those employing a port or receptacle, to the electronic device or an extra power source. If the touch sensitive surface is configured as a capacitance sensor, mechanical components within the user input attachment change state when a user actuates each key. This change of state is then transmitted to conductive pads of the user input attachment and detected by the capacitive sensor of the electronic device. The controller is then able to decipher the state changes as user actuation of a particular key, thereby responding accordingly. The user input attachment is therefore able to operate without the need of power sources for additional electronic components within the user input attachment.

In one embodiment, the user preferences employed by the adaptation module include electronic device reconfiguration preferences that depend upon the type of user input attachment that is coupled to the touch sensitive surface. These preferences can include tactile feedback or "haptic" profiles defined as predetermined parameters. The preferences may also include touch sensitivity, touch sensitive regions within which input will be received, the number and type of touch sensitive buttons on the user input attachment, and other information.

The preferences may further include information regarding display reconfiguration instructions to visually optimize a touch sensitive display because the data is visible about the user input attachment and not beneath opaque portions of the user input attachment. (Note that in one embodiment the user input attachment may have window portions through which the user may view portions of the display thereunder.) Other preferences include changes associated with performance parameters predetermined for optimal performance and user calibration preferences. If the user input attachment is decoupled from the touch sensitive surface, the electronic device may be configured to return to a normal operating mode.

In one embodiment, a touch sensitive display is backlit or otherwise illuminated such that light is projected towards the user when using the electronic device. Accordingly, in one embodiment the user input attachment is configured to employ this light to illuminate the keys on the user input attachment. Further, the preferences employed by the adaptation module can include causing the illumination component(s) within the touch sensitive display to increase or decrease its luminous output, thereby improving the visibility of features disposed along the user input attachment in certain situations such as dim light. The preferences may also comprise instructions for reconfiguring the illumination layer of the touch sensitive display to implement power savings when the electronic device with attached user input attachment is being used in strong lighting conditions.

In one embodiment, multiple user input attachments can be attached to the electronic device simultaneously. For example, in one embodiment described below, two user input attachments can be attached to the electronic device at opposite ends of a touch sensitive display so as to stimulate gaming controls.

User input attachments can be configured in various ways in accordance with embodiments of the invention. For example, large key keypads can be configured for individuals with less than optimal eyesight. Braille keypads can be configured for the visually impaired. In another embodiment, different user input attachments can be configured for different languages. Where this is the case, a user input attachment for a language of choice can be installed for a user at the time of purchasing the electronic device. Further, in one embodiment the when the user input attachment is coupled to the electronic device, the operating mode of the electronic device can automatically be configured to receive and deliver data in the language of choice.

In one embodiment, the user input attachment can be mechanically attached to the electronic device. For example, mechanical clasps for the user input attachment can be configured to wrap about the body of the electronic device, thereby retaining the user input attachment against the touch sensitive display either permanently or removably. Where employed removably, such clasps permit the user input attachment to be completely detached from the electronic device and treated as an accessory.

In another embodiment, the user input attachment may be mechanically retained with the electronic device by a lanyard or similar device. Such a configuration helps to prevent inadvertent loss of the user input accessory when detached from the touch sensitive surface of the electronic device.

In yet another embodiment, the user input accessory may be coupled to the electronic device by a hook and slider mechanism so as to be detachable from the touch sensitive surface yet non-detachable from the electronic device itself. Other attachment mechanisms include magnetic couplings, snaps, protective casing couplings, boot couplings, static attachment connectors, vertical locators, horizontal locators, and the like. Some of these various mechanical configurations will be illustrated in more detail below. These mechanical embodiments are intended to be illustrative only. As an alternate to mechanical attachments, the user input attachment can be attached to the touch-sensitive surface using static adhesion, mechanical suction, or in other ways.

Embodiments of the present invention provide numerous potential advantages over prior art data entry devices. One potential advantage is an improved tactile feedback provided by the keys of the user input attachment, which many users prefer. A second potential advantage is an increase in data input accuracy because the user receives tactile confirmation that a finger is on a particular key prior to actuation, which is not possible in devices having flat-surface touch screens or touch pads.

Next, as noted above, user input attachments configured according to embodiments of the present invention can include user input controls other than keys and replace or augment user input controls as desired. The user input controls can include sliders, rocker switches, toggle switches, rocker switches, and joysticks, just to name a few. Additionally, as will be shown below, the user input attachments of the present invention can be coupled to a touch sensitive surface of a corresponding electronic device in any of a number of locations. Thus, should a user desire to install the user input attachment at the top of the touch sensitive display, it can be done; likewise, should the user desire to place the user input attachment at the middle of the touch sensitive display, this can be done as well. In addition, where the electronic device to which the user input attachment is coupled includes sensors in areas other than the display, a user can couple the user input attachment to such areas, such as but not limited to, the sides and back of the electronic device.

Another potential advantage of embodiments of the present invention involves the physical operation of electromagnetic field-based touch sensor systems. In prior art electromagnetic field-based touch sensors, it is often a requirement that a user make physical skin-to-glass contact with the touch sensor in order for a touch to be detected. Said differently, a user wearing gloves, for example, may not be reliably detected by a touch sensitive system because the glove itself can be an insulating medium disposed between the capacitive sensor and the user's finger. With embodiments of the present invention, physical skin-to-glass contact is not required. Instead, the user actuates one of the buttons of the user input attachment. This key actuation delivers a signal to one or more conductive pads of the user input attachment regardless of whether there is an insulating medium disposed between the user's finger and the user input attachment. In short, embodiments of the present invention work regardless of whether a user wears gloves.

Turning now to the drawings, FIG. 1 illustrates one embodiment of an electronic device 100 and a user input attachment 102 configured in accordance with embodiments of the invention. In this embodiment, the user input attachment 102 is configured as an accessory that a user can conveniently attach and detach from the electronic device 100. The electronic device 100 includes a touch sensitive display 101, and may optionally include one or more general macro control buttons 103. As will be shown in more detail below, in one embodiment the touch sensitive display 101 comprises an electromagnetic field sensor that is configured to detect the presence of an object—such as a user's finger or conductive stylus—proximately located with touch sensitive display 101.

The user input attachment 102 shown in the illustrative embodiment of FIG. 1 is a "passive" user input attachment. The term "passive" is used because the user input attachment 102 does not need a power source or active electronic components, such as amplifiers, power switches, or control devices, to deliver user actuation input signals to the touch sensitive display 101.

In one embodiment, the user input attachment 102 includes a plurality of user actuatable keys 108 disposed along a first major face 109 of the user input attachment 102. As noted above, this plurality of user actuatable keys 108 can be configured in any of a number of variations. Some of these variations will be illustrated below in more detail with a discussion of FIG. 12. Examples of key configurations include that of a QWERTY keyboard, game specific controls, media player specific controls, navigation controls, user-friendly controls, and so forth.

In the illustrative embodiment of FIG. 1, a controller 104 is operable with the touch-sensitive display 101 and its electromagnetic field sensor. The controller 104, which may be a microprocessor, programmable logic, application specific integrated circuit device, or other similar device, is capable of executing program instructions, such as those shown in FIG. 11. The program instructions may be stored either in the controller 104 or in a memory 105 or other computer readable medium operable with the controller 104.

In one embodiment, the controller 104 is configured to be operable with both an identification module 106 and an adaptation module 107. The identification module and adaptation module 107 can be configured as executable code, or alternatively may be configured as hardware, such as in programmable logic or other devices incorporated in, substituted for, or operable with the controller 104. The controller 104, identification module 106, and adaptation module 107, are also configured to be operable with a display driver to effect and control presentation of information on the touch-sensitive display 101.

As shown in the illustrative embodiment of FIG. 1, the user input attachment 102 is mechanically configured to be attachable and detachable from the touch sensitive display 101. In the illustrative embodiment of FIG. 1, this is accomplished by mechanical arms extending distally from the user input attachment 102 that are configured to wrap about the electronic device 100. This detachability offers a user freedom to use the entire touch sensitive display in some contexts, while using the user input attachment 102 in other contexts. For instance, if the electronic device 100 is a smart phone with multimedia capabilities, when the user is watching a video—which requires little or no data input from the user—the user may desire to view the video using the entire touch sensitive display 101. In this situation, the user simply detaches the user input attachment 102 from the touch sensitive display. As will be shown below, in one embodiment the user input attachment 102 may then be stowed on the back of the electronic device 100 or otherwise tethered to the electronic device 100 to prevent it from being misplaced. Then, upon finishing the video, suppose the user wants to write an e-mail. The user may then attach the user input attachment 102 to the touch sensitive display 101 to employ the plurality of user actuatable keys 108 to enter data into the electronic device 100.

Figure 3:
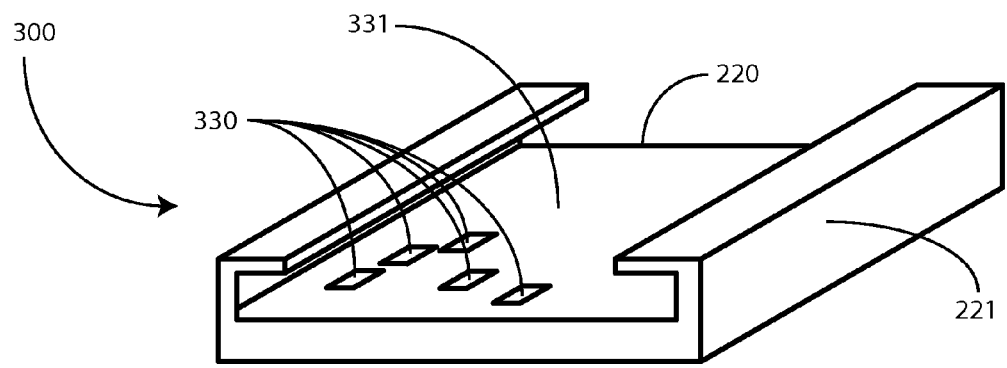
FIG. 3 illustrates one user input attachment having a plurality of conductive pads disposed on a second major face, and arranged in a characteristic configuration, in accordance with embodiments of the invention.

In one embodiment, as will be shown in more detail in FIG. 3, the user input attachment 102 is configured to deliver a temporal signature signal 110 to the touch sensitive display 101 upon attachment. The signature signal is temporal because it changes over time, as will be shown with reference to FIG. 30. This can be accomplished, for example, by using a plurality of conductive pads disposed along the underside of the user input attachment 102 that interact with the electromagnetic field sensor of the touch sensitive display 101. The conductive pads can be oriented in a predefined configuration, at specific locations along the user input attachment 102, and have predetermined sizes and shapes, or combinations thereof, so as to interact with the electromagnetic field sensor so as to deliver the temporal signature signal 110. A specific embodiment may use a carbon elastomeric material or other conductive materials to form the conductive pads. Further, a protective layer, such as a thin layer of thermoplastic material may be placed over the conductive pads as well.

In one embodiment, the temporal signature signal 110 is a series of signal magnitudes (m-axis), detected over time, spread along a surface (x-y plane) of the touch sensitive display 101. In FIG. 1, the x-axis 112 and y-axis 111 depicted with the temporal signature signal 110 correspond to planar dimensions along the touch sensitive display 101. Similar signature signals and the analysis thereof are described in commonly-assigned, copending U.S. patent application Ser. No. 12/570,140, entitled "Methods and Apparatus for Distinguishing Between Touch System Manipulators," filed Sep. 30, 2009, with Timothy Dickinson and William Alberth inventors, which is incorporated herein by reference for all purposes.

In one embodiment, the identification module 106 analyzes the temporal signature signal 110 to identify the user input attachment 102. This can be accomplished in a variety of ways, such as determining the x-y planar area associated with the temporal signature signal 110, the locations, shapes, and magnitudes of peaks in the temporal signature signal 110, the time-based decay of peaks in the temporal signature signal 110, and so forth.

While analysis of the temporal signature signal 110 is one method of identifying the user input attachment 102, it will be clear to those of ordinary skill in the art embodiments of the invention are not so limited. Other identification techniques may be substituted. For instance, acoustic sensors may be substituted for the electromagnetic field sensors. The identification module 106 may then be configured to analyze the sound received from the sensors when the user is attaching the module determine the identity of the user input attachment 102. Similarly, piezoelectric crystals can be substituted for the conductive pads. Accordingly, the identification module 106 can be configured to analyze vibrational signals delivered by the crystals to the touch sensitive display 101. Alternatively, magnetometers can be substituted for the conductive pads. Accordingly, the identification module 106 can be configured to analyze variations in magnetic fields in relative to the touch sensitive display 101. As another example, optical couplers can be substituted for the conductive pads. Accordingly, the identification module 106 can be configured to analyze variations in the wavelength of light or reflectivity relative to the touch sensitive display 101.

Using the temporal signature signal 110, the identification module 106 can detect and analyze various electrical characteristics or signal parameters delivered by the user input attachment 102 to the touch sensitive display 101. In one embodiment, the identification module 106 can be configured to determine an amplitude and/or magnitude of the temporal signature signal 110 across the touch sensitive display 101. This amplitude can then be monitored to determine the rate of charge dissipation over time, thereby defining the "temporal" or time-based characteristics of the signal. This amplitude can be combined with other parameters such as the area, shape, size, or combinations thereof, with some or all being measured across time, of the temporal signature signal 110.

The resulting temporal characteristics can then be compared with predefined models, tolerances, or threshold limits to uniquely identify the type of user input attachment 102. For example, one type could be a family of alphanumeric keyboards, another type could be a family of numeric keyboards, and a third type could be a family of gaming controllers. From type identification, the controller 104 can determine from a predefined list stored in memory the specific configuration and other features of the user input attachment 102. For example, within a single type (e.g., alphanumeric keypads) there can be a number of different attachments for different languages and with different key configurations (e.g., US-QWERTY keyboards, US-Dvorak keyboards, Spanish-QWERTY keyboards, Braille keyboards, etc.).

The x-y planar location of the temporal signature signal detected across the touch sensitive display 101 can be a characteristic used to identify the attachment location and orientation of the user input attachment 102. For instance, in addition to performing analysis on the temporal signature signal 110 to identify the user input attachment 102, the controller 104 can be configured to determine the location of signal delivery and use the x-y planar location information to determine the placement and orientation of the module.

For example, in one embodiment the controller 104 can employ triangulation or other algorithms among sensors in the electromagnetic sensor to determine the location of signal delivery. Where the sensor disposed within the touch sensitive display 101 is a capacitive sensor, however, the controller 104 can be configured to determine location directly from signals delivered by the capacitive sensor. As will be shown later, the user may vary the location and orientation of the attached user input attachment 102, and the placement of the module may affect the behavior of the electronic device 100.

After the identification module 106 has identified the user input attachment 102 and optionally its placement (i.e., location and/or orientation), the adaptation module 107 is configured to reconfigure the electronic device 100. In one embodiment, this reconfiguration occurs upon the user input attachment 102 being attached to the touch sensitive display 101 and identified by the identification module 106.

The adaptation module 107 can reconfigure the electronic device 100 in a variety of different ways. In one embodiment, the adaptation module 107 can be configured to reconfigure the way data is presented on the touch sensitive display 101. For example, the adaptation module 107 can cause data such as pictures, text, and other information, to be presented adjacent to the user input attachment 102. The term "adjacent" means that this information is presented around, rather than under, opaque portions of the user input attachment 102. Such reconfiguration ensures that the user input attachment 102 does not block or otherwise prevent the user from seeing information that is presented on the touch sensitive display 101. This reconfiguration can include moving information, rescaling information, or re-positioning information as a particular application running on the electronic device 100 may require.

In another embodiment, the adaptation module 107 can be configured to launch one or more user applications when the user input attachment 102 is attached to the touch sensitive display 101. Illustrating by way of example, if the user input attachment 102 is configured as a particular game controller, a user preference in memory may request that a particular game be launched when the user input attachment 102 is attached to a touch sensitive surface. Note that the touch sensitive surface need not be a display surface and could be a touchpad, as will be shown in FIG. 34 below. Similarly, if the user input attachment 102 is configured as a media player controller, the user may desire a music player or video player application to be launched by the electronic device when the media player user input attachment 102 is coupled to the touch sensitive surface. Accordingly, the controller 104 can be configured to operate in conjunction with the adaptation module 107 to achieve these results.

In another embodiment, the adaptation module 107 can be configured to alter settings relating to signal levels or other data input characteristics that can or will be received by the touch sensitive surface. For instance, the adaptation module 107 can be configured to recalibrate the electromagnetic sensor of the touch sensitive surface to compensate for any residual effects of the temporal signature signal and/or to more accurately receive signals subsequently delivered by the passive user input attachment 102 due to user actuation of the keys, sliders, rocker switches, toggle switches, joysticks, or other user controls of the user input attachment 102.

Figure 2:
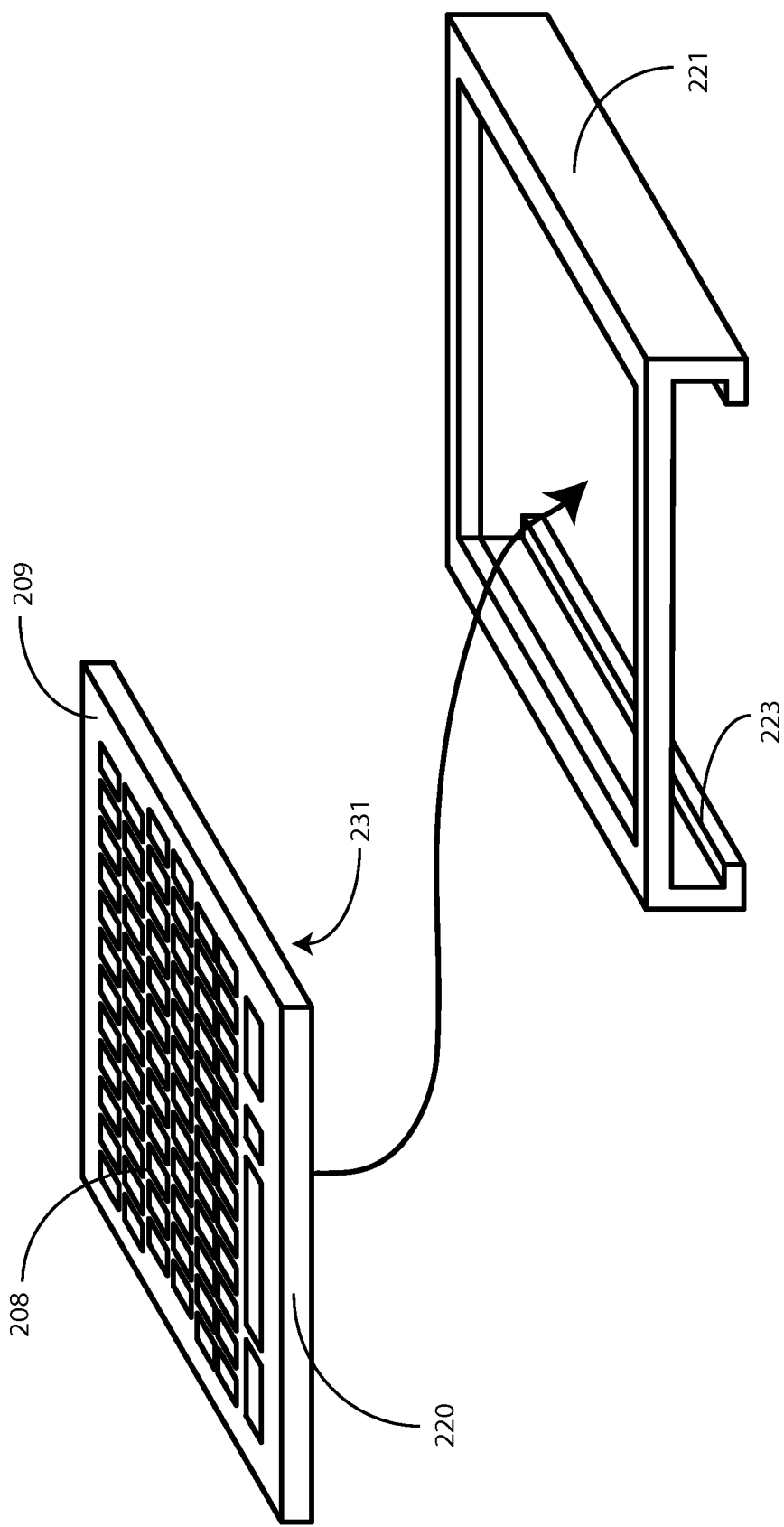
FIG. 2 illustrates an exploded view of one user input attachment in accordance with embodiments of the invention.

FIG. 2 illustrates an exploded view of the user input attachment 102 shown in FIG. 1. As will be shown throughout the disclosure, user input attachments configured in accordance with embodiments of the invention can attach to touch sensitive surfaces of electronic device using a variety of methods. For simplicity of discussion, in many of the views, a mechanical slide or snap on configuration will be used to illustrate various aspects of the user input attachment. It will be clear to those of ordinary skill in the art having the benefit of this disclosure that the embodiments of the invention are not so limited. Other attachment mechanisms may be substituted for the mechanical slide or snap on configuration without departing from the spirit or scope of the invention.

In the illustrative embodiment of FIG. 2, the user input attachment 102 includes a keypad portion 220 and "personality piece" 221. The keypad portion 220 includes a plurality of user actuatable keys 208 disposed along a first major face 209 of the keypad portion 220. Mechanical components, as will be shown in FIGS. 20-28, are disposed within the keypad portion 220. One or more conductive pads that are configured to alter the electromagnetic fields of an electromagnetic field sensor in a touch sensitive surface of an electronic device (not shown in FIG. 2 but illustrated in FIG. 34) are disposed along a second major face 231 opposing the first major face 209, as will be shown in FIG. 3.

The personality piece 221 comprises a mechanical connector suitable for retaining the second major face 231 against the touch sensitive surface (not shown). The personality piece 221 can be manufactured, for example, from thermoplastics in an injection molding process. The personality piece 221 can include mechanical features, devices, connections, or connectors 223 for coupling the personality piece 221 to an electronic device (100).

Figure 6:
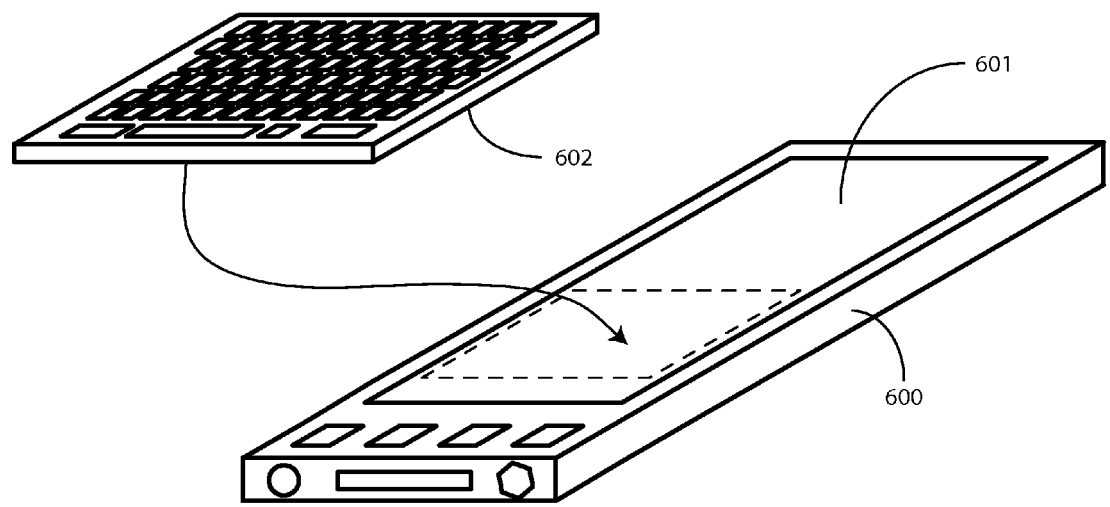
FIG. 6 illustrates an alternate embodiment of attaching the user input attachment to a touch sensitive display in accordance with embodiments of the invention.

As will be shown in FIG. 6, in some embodiments personality pieces are not required. However, as will be shown in FIGS. 18 and 19, additional features can be provided when a personality piece 221 is employed. For instance, the user input attachment 102 can be mechanically coupled to the rear of the electronic device (100) when not in use to avoid accidental misplacement.

When the keypad portion 220 and personality piece 221 are configured as separate components during manufacture, it becomes possible to use one keypad portion 220 with a variety of personality pieces. Thus, a standard keypad portion 220 can be used with electronic devices having different form factors and coupling mechanisms by attaching copies of the same keypad portion into different personality pieces. The keypad portion 220 can be attached to the personality piece 221 in a variety of ways, including with adhesives, heat staking, snaps, or other retention mechanisms. Also, one personality piece 221 can be designed to accommodate a variety of keypad portions. In this situation, a standard personality piece 221 for a particular electronic device can accept different specific keypad portions of the same type (e.g., US-QWERTY keypad portion, USA-Dvorak keypad portion, Spanish-QWERTY keypad portion) or of different types (e.g., USA-QWERTY keypad portion with small keys, numeric keypad portion with large keys, etc.).

The user input attachment 102 of FIG. 2 is shown as being detachable from not only a touch sensitive display (101), but also being completely detachable from an electronic device (100) as well. This "complete" detachability offers some advantages in that it can be customized to a particular user preference or application. Further, such an accessory can be sold to consumers separately from the electronic device. Additionally, the various components can be customized in accordance with any of the following factors: Topology; Topography; Color combination; Language; Application control preferences; Unique electronic device features; and so forth.

FIG. 3 illustrates a bottom perspective view 300 of the user input attachment 102 of FIG. 2 after the keypad portion 220 has been coupled to the personality piece 221. In the illustrative embodiment of FIG. 3, a plurality of conductive elastomeric pads 330 are disposed along a second major face 331 of the keypad portion 220. The plurality of conductive pads 330 are, in one embodiment, arranged in a characteristic configuration in accordance with a predetermined overall pattern, pad shape, or pad size. The plurality of conductive pads 330 are configured to interact with the electromagnetic field sensor of the touch sensitive display (101).

As noted above, the keypad portion 220 can include a plurality of user actuatable keys 208 disposed along the first major face 209 opposing the second major face 331. While the number of conductive pads can be equal to the number of keys, in one embodiment the number of conductive pads is fewer than the number of keys. This promotes an efficient x-y planar design for the user input attachment (102). In such a configuration, signals from each user-activated key can be multiplexed through the lesser number of conductive pads and delivered to the touch sensitive display (101). Additionally, the mechanical aspects of each key can be altered so that other information, such as angle of attack (whether the key is being struck by a finger from the west (left), east (right), north, or south side), can be determined. Where the number of carbon pads is less than the number of keys, the adaptation module (107) can be configured to configure the controller (104) to interpret the multiplexed inputs from the conductive pads to properly receive the user's intended inputs.

Figure 4:
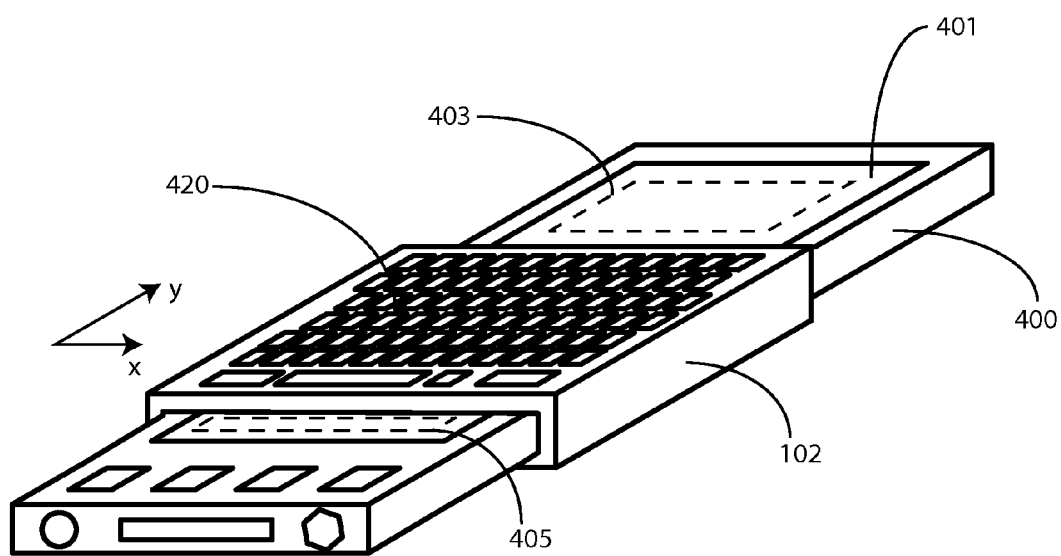
FIG. 4 illustrates a perspective view of an electronic device having a touch sensitive display with a user input attachment coupled thereto in accordance with embodiments of the invention.

FIG. 4 illustrates a perspective view of the user input attachment 102 attached to an electronic device 400 such that the second major face of the keypad portion 420 is disposed adjacent to a touch sensitive display 401 of the electronic device 400.

In the illustrative embodiment of FIG. 4, the user input attachment 102 has been attached to the touch sensitive display 401 towards the bottom of the touch sensitive display 401. Accordingly, the adaptation module (107) has reconfigured the data presentation of the touch sensitive display 401 to be adjacent to the user input attachment 102 by moving, scaling, repositioning, or otherwise reformatting data to fall within a data presentation window 403 above (positive y-axis direction) the user input attachment 102 or a data presentation window 405 below (negative y-axis direction) the user input attachment 102.

Because the second data presentation window 405 is smaller in size than the first data presentation window 403, the adaptation module (107) may determine that applications requiring the presentation of large data elements—such as photograph display applications—may present data within the first data presentation window 403, while applications requiring the presentation of smaller data, e.g., a stock ticker application, may present data within the second data presentation window 405.

If the location or orientation of the user input attachment 102 is altered by the user, such as by sliding or by detaching the user input attachment 102 and reattaching it in another position along the touch sensitive display 101, the adaptation module (107) may determine that the available display "real estate" above and beneath the user input attachment 102 has changed. Accordingly, the adaptation module may cause running applications within the electronic device 400 to present data in different windows to optimize overall visibility to the user.

Figure 5:
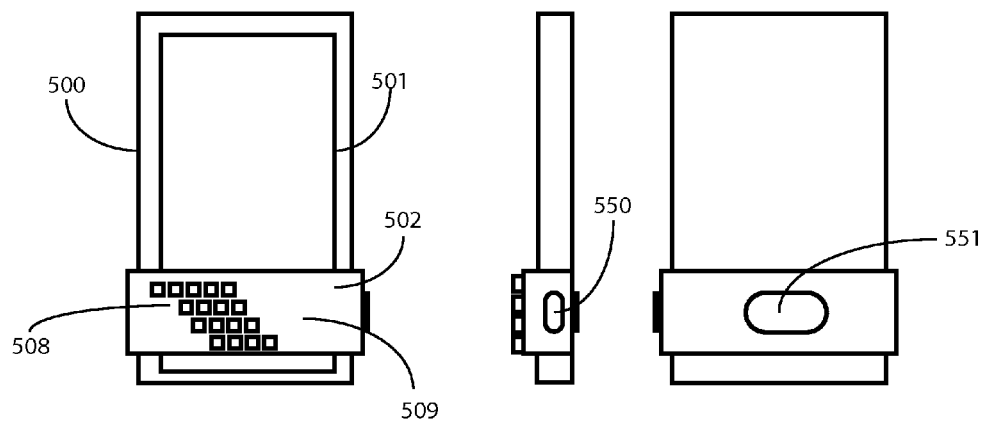
FIG. 5 illustrates another embodiment of a user input attachment coupled to an electronic device in accordance with embodiments of the invention.

FIG. 5 illustrates an alternate embodiment of a user input attachment 502 coupled to an electronic device 500 in accordance with embodiments of the invention. In the illustrative embodiment of FIG. 5, the user input attachment 502 is configured as a sleeve that wraps about the body of the electronic device 500 with additional surfaces available for user controls.

As shown in FIG. 5, the user input attachment 502 includes a plurality of user actuatable keys 508 disposed along a first major face 509 of the user input attachment 502. Additionally, the user input attachment 502 includes additional controls 550, 551 on other external faces of the user input attachment 502. These additional controls 550, 551 are configured, in one embodiment, to deliver actuation signals to the touch sensitive display 501, as previously described, through a conduit passing through the user input attachment 502 to the conductive pads that are coupled to the touch sensitive display 501. Examples of additional controls 550, 551 include mode selection buttons, navigation buttons, power buttons and the like. It is well to note that any of the controls may reside on any of the faces of the user input attachment.

FIG. 6 illustrates an alternate connection mechanism for retaining a user input attachment 602 to a touch sensitive display 601 of an electronic device 600. Some embodiments of the invention, such as that shown in FIG. 6, employ alternate mechanical features, devices, connections, or connectors configured to attach the user input attachment 602 to the body of the electronic device 600.

In FIG. 6, the exterior, bottom surface of the user input attachment 602 is manufactured from a pliable material, such as silicone, polyethylene terephthalate (PET) film, that is configured to use static charge, suction, magnetic attraction, gravity, or combinations thereof to retain itself to the touch sensitive display 601. As such, the mechanical couplings are to the touch sensitive display 601 itself, not to the body of the electronic device 600. The configuration of FIG. 6 offers advantages in that the user input attachment is "device housing independent" in that the user input attachment 602 does not depend on any surface, other than the exterior of the touch sensitive surface, for attachment. Note that the user input attachment 602 may be secured in place by other methods, such as magnetically or by gravity, with or without mechanical locators to align the user input attachment 602.

Figure 9:
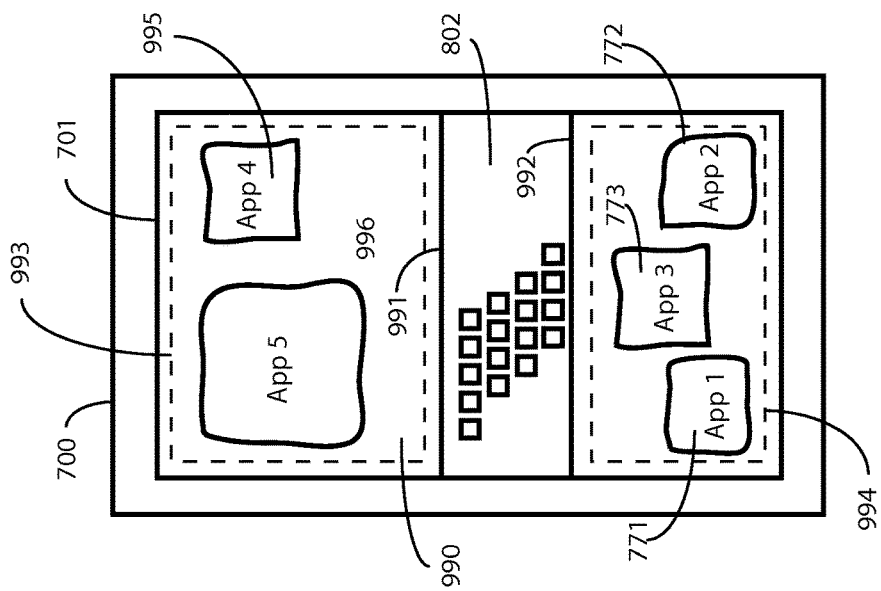
FIG. 9 illustrates a third exemplary mode of operation for an electronic device having a user input accessory attached thereto in a central location along the touch sensitive display in accordance with embodiments of the invention.
Figure 8:
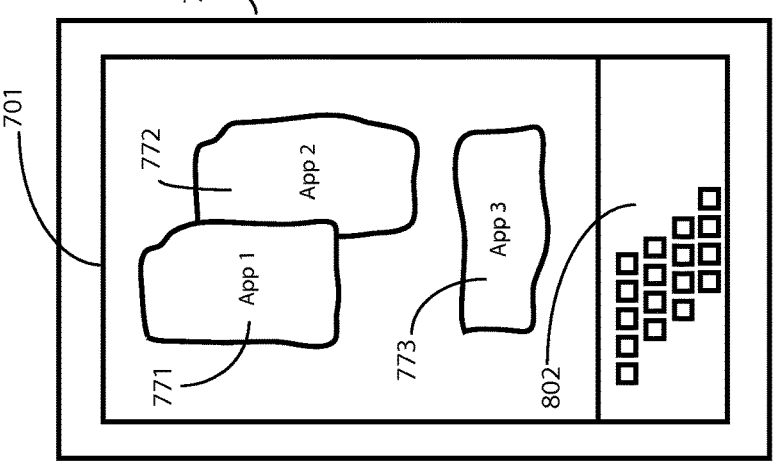
FIG. 8 illustrates a second exemplary mode of operation for an electronic device having a user input attachment attached thereto in accordance with embodiments of the invention.
Figure 7:
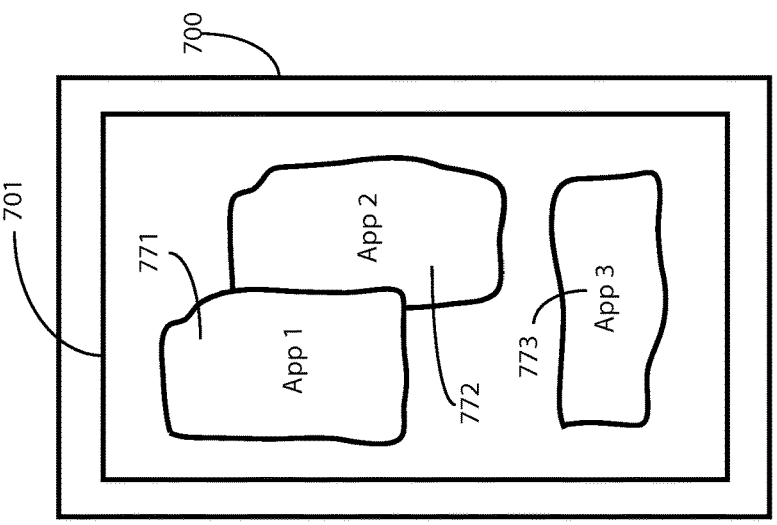
FIG. 7 illustrates a first exemplary mode of operation in an electronic device configured in accordance with embodiments of the invention.

FIGS. 7-9, illustrate an electronic device 700 operating in various modes. FIG. 7 illustrates the electronic device 700 operating in a default mode, where no user input attachment is attached. FIGS. 8 and 9 illustrated two adaptive modes where the adaptation module (107) has reconfigured the electronic device 700 to present data in different ways in response to a user input attachment 802 being identified and sensed to be attached in a particular location and configuration. As will be shown in these figures, in one embodiment of the invention, the user input attachment 802 is configured so as to be selectively positionable at any of the plurality of locations on the touch sensitive display 701. Accordingly, the adaptation module of the electronic device is configured to adjust the presentation of information on the touch sensitive display 701 depending, in one embodiment, upon the attached location of the user input attachment 802.

In FIG. 7, the electronic device is operating in the default mode because no user input attachment has been attached to the touch sensitive display 701. Note that the "default" mode can take a variety of forms and is intended to refer to a mode in which no user input attachment has been attached. In the illustrative embodiment of FIG. 7, the default mode has three applications 771, 772, 773 running. These applications 771, 772, 773 may be applications that have been selected and launched by a user. Alternatively, they may be applications that are always operational. Further, they may be user preference applications that are launched when a particular user activates the electronic device 700, such as with a personal identification number or access code.

In FIG. 7, the applications 771, 772, 773 each display data in a corresponding window. The windows corresponding to the first application 771 and second application 772 slightly overlap, while the window corresponding to the third application 773 is disposed beneath the overlapping applications 771, 772. While the specific orientation is not important, in the illustrative embodiment of FIG. 7 the applications are arranged such that they substantially fill the area of the touch sensitive display 701 so as to each be visible simultaneously by the user.

Turning now to FIG. 8, in this embodiment a user input attachment 802 configured as a QWERTY keyboard has been attached to the touch sensitive display 701 near the bottom margin as shown. As such, the area of the touch sensitive display 701 beneath the user input accessory is rendered less than desirable for the presentation of information, except in scenarios where the user input attachment 802 is configured to be transparent, translucent, or pellucid. As such, the adaptation module has reconfigured the data presentation along the touch sensitive display 701 to be adjacent—and in this case above (in the positive y-axis direction)—the user input attachment 802. In the illustrative embodiment of FIG. 8, this has been accomplished by scaling and repositioning the data associated with the three active applications 771, 772, 773.

Turning now to FIG. 9, in this illustrative embodiment the user input attachment 802 has been attached to the touch sensitive display 701 along an interior region 990 of the touch sensitive display 701. The interior region (990) is "interior" because portions of the touch sensitive display 701 are visible on at least a first side 991 of the touch sensitive display 701 and a second side 992 of the touch sensitive display 701. Note that portions of the touch sensitive display 701 could equally be visible on four sides of the touch sensitive display 701, as would be the case where the user input attachment 802 were rotated by 90 degrees. Accordingly, "interior" as used herein means that portions of the touch sensitive display 701 are visible along a plurality of sides of the user input attachment 802.

To optimize visibility of data presented on the touch sensitive display 701, the adaptation module has reconfigured a first portion 993 of the touch sensitive display 701 extending from the first side 991 of the user input attachment 802 to the edges of the screen as shown differently from a second, non-overlapping portion 994 of the touch sensitive display 701 extending from the second side 992 of the user input attachment 802 to the edges of the screen (as shown). In this illustrative embodiment, the data from the first application 771, second application 772, and third application 773 have been scaled and repositioned along the second portion 994 of the touch sensitive display 701. Additionally, in accordance with user preference parameters stored within a memory of the electronic device 700, a fourth application 995 and fifth application 996 have been launched, with their data being presented within the first portion 993 of the touch sensitive display 701. The launching of additional applications may be dependent upon the identification and location of the user input attachment 802 when attached. For example, the fourth application 995 may be a text messaging application (in a create new text message mode) launched due to the attachment of the QWERTY keyboard in a position that creates a section portion 993 of at least a minimum size above (in a positive y direction) the user input attachment 802.

The embodiment of FIG. 9 offers a glimpse into the flexibility and mode control offered by embodiments of the invention. In this illustrative embodiment, the user had a preference profile stored indicating that the fourth application 995 and fifth application 996 should be launched when the user input attachment 802 is attached within this particular interior region 990. Where this had not been the case, the adaptation module may have reconfigured the electronic device 700 such that the data from the first application 771 and second application 772 was presented in the first portion 993 of the touch sensitive display 701, while data from the third application 773 was presented in the second portion 994, and so forth. Other combinations or presentations of data are additionally possible. Further, the user may store preferences of presentation in a user profile in memory that is operational with and accessible by the adaptation module.

Figure 10:
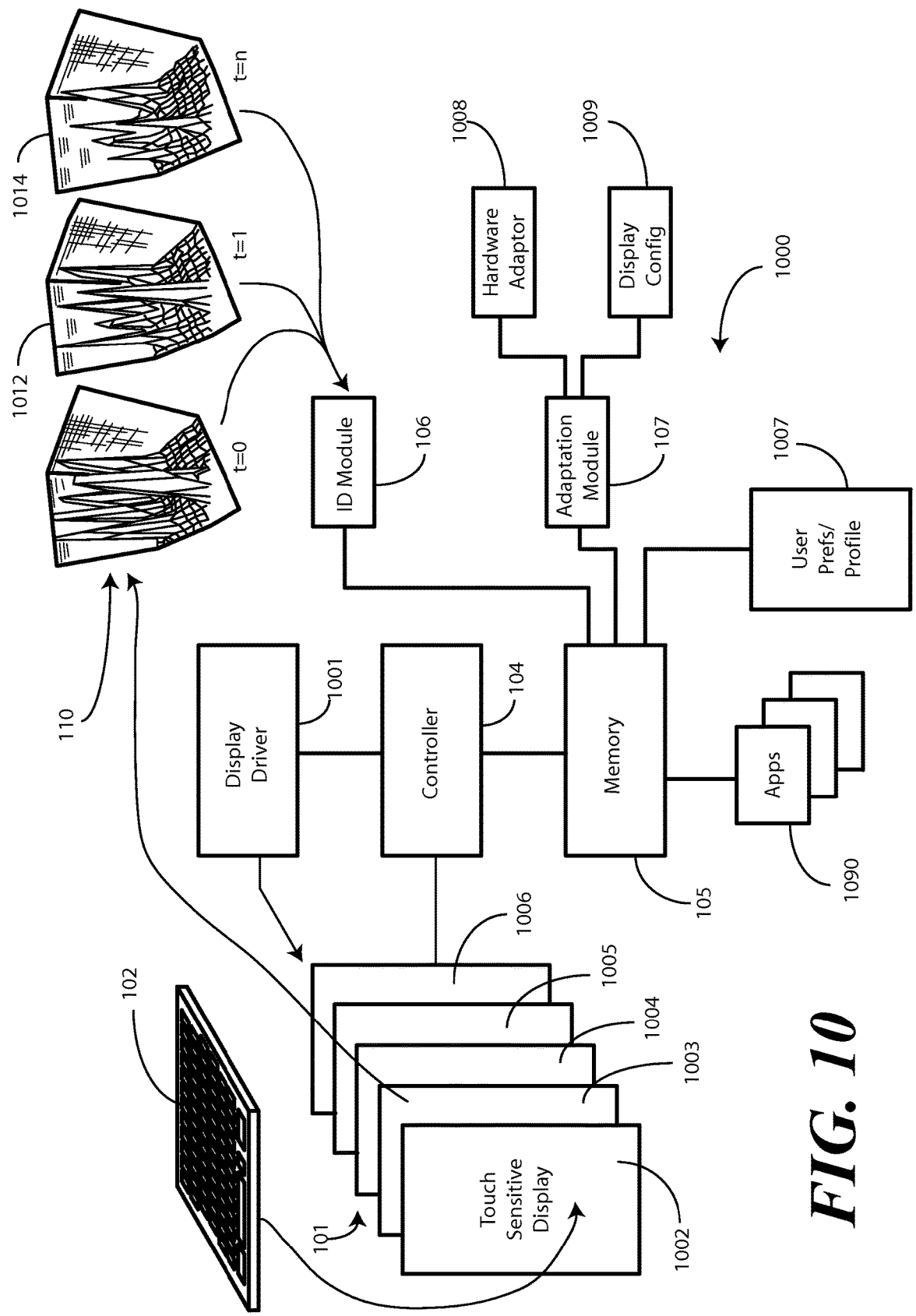
FIG. 10 illustrates a schematic block diagram of an electronic device, including an exploded view of one touch sensitive display, configured in accordance with embodiments of the invention.

Turning now to FIG. 10, the drawing shows a schematic block diagram 1000 of one embodiment of internal circuitry, software modules, firmware modules, and other components in an electronic device in accordance with embodiments of the invention. While this illustrative internal circuitry is directed to a generic electronic device, note that it could be readily adapted to any number of specific devices, including mobile telephones, smart phones, personal digital assistants, palm-top computing platforms, remote controllers, and other devices.

The controller 104 is configured to operate the various functions of the electronic device. The controller 104 may also be configured to execute software or firmware applications stored in memory 105. The controller 104 can execute this software or firmware to provide device functionality.

Coupled to and operable with the controller is a touch sensitive display 101. The touch sensitive display 101, operable with a display driver 1001, is shown in this illustrative embodiment as having a plurality of layers including a grouping of touch-sensitive layers and a grouping of display layers. While this is one embodiment of a touch sensitive display 101, it will be clear to those of ordinary skill in the art having the benefit of this disclosure that embodiments of the invention are not so limited. Numerous other touch sensitive surfaces can be substituted without departing from the spirit and scope of the invention.

In the illustrative embodiment of FIG. 10, five layers are shown. Starting from the top, a cover layer 1002, which may be manufactured from glass or a thin film sheet, serves as a unitary fascia member for the electronic device. A "fascia" is a covering or housing, which may or may not be detachable. Suitable materials for manufacturing the cover layer include clear or translucent plastic film, glass, plastic, or reinforced glass. Reinforced glass can comprise glass strengthened by a process such as a chemical or heat treatment. The cover layer 1002 may also include an ultraviolet barrier. Such a barrier is useful both in improving the visibility of display layer 1004 and in protecting internal components of the electronic device.

Beneath the cover layer 1002 is a electromagnetic field sensor 1003. The electromagnetic field sensor 1003, which can be constructed by depositing small capacitive plate electrodes on a transparent substrate, is configured to detect the presence of an object, such as a user's finger, near to or touching the touch sensitive display 101. Control circuitry operable with or disposed within the controller 104 is configured to detect a change in the capacitance of a particular plate combination on the electromagnetic field sensor 1003. The electromagnetic field sensor 1003 may be used in a general mode, for instance to detect the general proximate position of an object relative to the touch sensitive display 101. The electromagnetic field sensor 1003 may also be used in a specific mode, where a particular capacitor plate pair may be detected to detect the precise location of an object along length and width of the touch sensitive display. Note that the electromagnetic field sensor 1003 is a particular implementation of an electromagnetic field sensor, and other types of electromagnetic field sensors, such as a magnetic field sensor, can replace the capacitive field sensor.

The temporal signature signal 110 delivered to the electromagnetic field sensor 1003 is dependent upon the size, shape, placement, arrangement, material, and combinations thereof of the conductive pads present upon the user input attachment 102. The capacitive sensors in the electromagnetic field sensor 1003 establish an electric field flowing therebetween. An approaching conductive pad can absorb or redirect the field, thereby altering the amount of collected charge on any one sensor. Attaching the user input attachment 102 having characteristic conductive pads causes an initial temporal signature signal 110 at time t=0. Additional passive components, including resistive or inductive elements, can be coupled with the conductive pads to provide temporal signature decay as well. In the example shown, at time t=1, the field 1012 magnitudes have changed and at time t=n the field 1014 magnitudes have stabilized. In this example, three time units are shown; however other embodiments may have more complicated or less complicated temporal signature signals.

Beneath the electromagnetic field sensor 1003 is a display layer 1004. Note that while the electromagnetic field sensor 1003 can be adjacent to the display layer 1004, in one embodiment there is a gap disposed between the electromagnetic field sensor 1003 and the display layer 1004. In another embodiment, a layer of adhesive (not shown) is disposed between the electromagnetic field sensor 1003 and the display layer 1004.

In one embodiment, the display layer 1004 comprises a high-resolution display. An electroluminescent layer or light-emitting diode (LED) backlighting layer 1005 may be disposed beneath the display layer 1004 and may be configured to project light through the display layer 1004 so as to backlight the display layer 1004. The display layer can adaptively present text, graphics, user actuation targets, data, and controls along the touch sensitive display 101.

A haptic layer 1006 may be disposed beneath the electroluminescent layer 1005. The haptic layer 1006 can be configured to provide a pseudo-tactile feedback in response to user actuation of virtual buttons or controls presented on the touch sensitive display 101. In short, when the user input attachment 102, which can have real, popple-style buttons disposed thereon, is not coupled to the touch sensitive display, the haptic layer 1006 can simulate those popples by delivering a tactile response to the body of the electronic device.

In one embodiment, the haptic layer 1006 includes a transducer configured to provide a sensory feedback when a user actuates a virtual key. In one embodiment, the transducer is a piezoelectric transducer configured to apply a mechanical "pop" to the body of the device that is strong enough to be detected by the user. Thus, the tactile feedback layer provides sensory feedback to the user, thereby making the smooth, substantially planar touch sensitive display 101 react like a conventional keypad.

Turning now to the modules, the identification module 106 and the adaptation module 107 are both shown in FIG. 10. Their operation has been substantially described above. The identification module 106 is configured to detect and identify the user input attachment 102 from a temporal signature signal 110, which is shown decaying across time in FIG. 10.

The adaptation module 107 is configured to reconfigure operating characteristics of the electronic device in response to the user input attachment 102 being attached and identified. As shown in FIG. 10, the adaptation module 107 can comprise a hardware adaptor 1008 and a display configuration adaptor 1009. The hardware adaptor 1008 can be configured to, for example, recalibrate gains and thresholds of the sensors in the touch sensitive display 101 to compensate for residual fields 1014 of the temporal signature signal and properly receive user actuation signals from the user input attachment 102. The display configuration adaptor 1009 can be configured to resize, scale, reposition, and relocate information presented on the touch sensitive display 101. Further, as noted above, the display configuration adaptor 1009 can be configured to launch applications 1090 or enable other preferred operating characteristics as well.

In one embodiment, the adaptation module 107 is configured to work in conjunction with a user preference profile 1007 stored in a memory 105 of the electronic device. The user preference profile 1007 can take a variety of forms, a few of which will be described here.

In one embodiment, the user preference profile 1007 will include operating characteristics corresponding to preferred operational modes of the electronic device. These preferred operational modes can be enabled by the adaptation module 107 when the user input attachment is attached to the touch sensitive display 101. Preferred operating modes can include the following: predefined input regions along the touch sensitive display that correspond to a characteristic configuration of conductive pads associated with an identified user input accessory 102; a preferred tactile response to be delivered by the electronic device upon user actuation of the one or more keys disposed along the user input attachment 102; preferences concerning applications launched or the presentation of data as previously described; and keypad sensitivities corresponding to user actuation of the keys on the user input attachment 102. The user preference profile 1007 can also include parameters to be used with the hardware adaptor 1008, such as one or more amplification levels for signals received from the plurality of conductive pads, or one or more threshold levels for signals received from the conductive pads. Other parameters will be obvious to those of ordinary skill in the art having the benefit of this disclosure.

Figure 11:
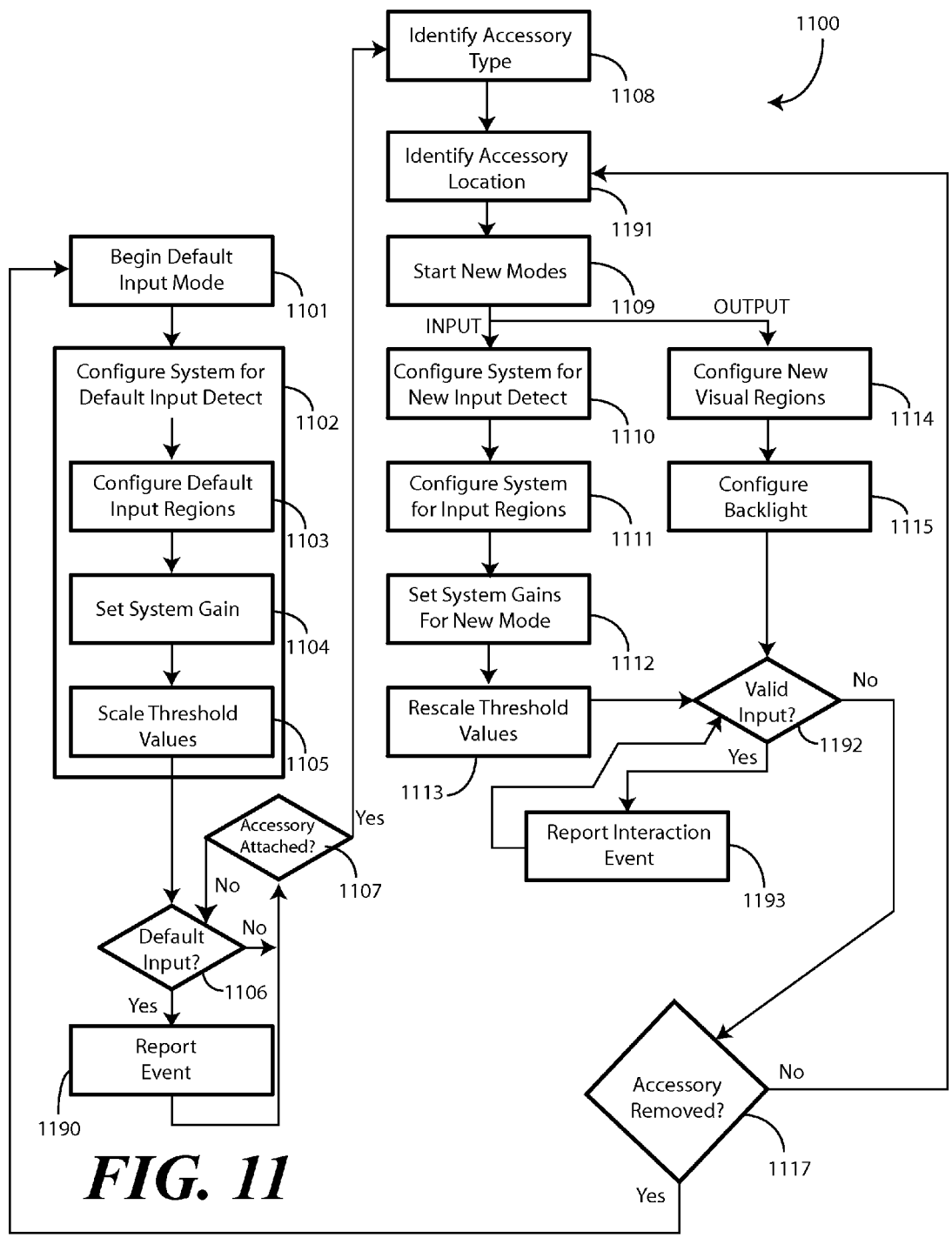
FIG. 11 illustrates one illustrative method of operating an electronic device configured to work with a detachable user input attachment in accordance with embodiments of the invention.

FIG. 11 illustrates a method 1100, which can be executed by employing one or more controllers in an electronic device, of configuring the electronic device in response to a user input attachment being attached to a touch sensitive surface in accordance with embodiments of the invention.

At step 1101, the electronic device starts by operating in a default input mode as depicted in FIG. 7. The touch sensitive surface of the electronic device is configured for default operation at step 1102. The configuration step 1102 may include configuring default input regions 1103 such as configuring the entire touch-sensitive surface to accept touch input or configuring only a portion of the touch-sensitive surface to accept touch input (e.g., when the device is in a "locked" mode). System configuration for the default operation may also including setting gains for the touch sensitive surface at step 1104, and setting thresholds for determining whether a touch interaction has occurred at step 1105. For example, these levels may differ depending on whether the default mode expects to receive touch input from user's finger or touch-input from a stylus, whether the default mode supports single-touch or multi-touch, and other variables.

Decision step 1106 determines whether a valid input for the default operational mode has occurred. For example, if default operation comprises a user touching a single finger to touch sensitive display, a valid default input can be a tap, a swipe, or a series of single-finger (or multi-finger) gestures upon the touch-sensitive surface. Step 1190 reports the event to the controller, which makes the appropriate response within the electronic device, and the method 1100 returns to step 1106 for further inputs. Continuing this example where default operation expects a user touching the touch-sensitive surface with a single finger, the controller may interpret attachment of a user input attachment with multiple conductive pads as a non-standard default-mode input. Decision step 1107 evaluates the non-standard input. If the non-standard input is a result of user error (e.g., touching with two fingers instead of one, a paperclip accidentally contacting the touch-sensitive surface, etc.), the method 1100 returns to step 1106. Where the non-standard event is interpreted to be attaching the user input attachment to the touch sensitive surface, decision step 1107 proceeds to identify the user input attachment 1108.

In step 1108, an identification module 106 (FIGS. 1 and 10) identifies the user input attachment from a temporal signature signal produced by the interaction of the conductive pads on the user input attachment with the electromagnetic fields of the touch-sensitive surface. Additionally, the identification module can be configured to determine 1191 the placement location of the user input attachment along the touch sensitive surface. Upon the identification, and optionally determination of location, of the user input attachment, the adaptation module alters various settings within the electronic device, including the input detection mode and the presentation mode of the electronic device.

Specifically, at step 1109, the adaptation module actuates new operating modes, which are shown here as a new input operating mode and a new output operating mode. Two exemplary output operating modes were shown in FIGS. 8 and 9 above.

At step 1110, the adaptation module can configure the touch sensitive surface for different input detection methods. For instance, if the default mode of operation included detecting a user's finger touching the touch sensitive surface, when the user input attachment is coupled to the touch sensitive surface, the new input section method may be that of detecting signals coming from conductive pads disposed beneath the user input attachment. Part of step 1110 may include compensating for the residual electromagnetic field disturbances caused by the temporal signature signal. After compensation, when a user presses a key of the accessory, and input signals are multiplexed through the conductive pads, the input signals will be received, properly.

At step 1111, the adaptation module can configure system behaviors for input regions. For example, a first input region can be beneath the attachment and in contact with the conductive pads while a second input region can be the remainder of the touch-sensitive surface. Thus, the first input region expects input signals only at predetermined locations (i.e., the locations under the conductive pads) while the second input region expects a single-touch finger input. Additionally, a third input region could be implemented that does not accept any input (e.g., the electromagnetic field is not active in the third region).

At step 1112, the adaptation module can set system gains to receive signals from the user input attachment in the first input region and set system gains to receive signals from a user's finger in the second input region. At step 1113, the adaptation module can set threshold values to determine when valid signals are received from the user input attachment in the first region and from a user's finger in the second region. In some implementations, the electromagnetic field can be active in the third region but the threshold value is set so high that no touch interaction will trigger a touch event.

Turning now to presentation (electronic device output) elements, at step 1114, the adaptation module can configure new visual regions as were described above with respect FIGS. 8 and 9. Specifically, at this step 1114, the adaptation module can, for example, present information from a first application of the electronic device on a first portion of the touch sensitive display proximate the first edge of the user input device, while presenting information from a second application of the electronic device on a second portion of the touch sensitive display proximate with the second edge of user input device. Such a configuration was shown above in FIG. 9. As mentioned previously, the display regions may change depending on the size, shape, and placement of the user input accessory.

At step 1115, backlighting can be configured. As noted above, the backlight can be an electroluminescent layer, a LED-backlight, or other similar backlighting source. As will be shown below, in some embodiments, the user input attachment can be configured with one or more light pipes or light conduits that pass light from the backlighting layer through portions of the user input attachment. The physical configuration of the user input attachment may determine which type of backlight is most appropriate for a particular application. Further, as noted above, in some embodiments, the user input attachment may be disposed along a touch sensitive surface rather than atop a touch sensitive display.

Accordingly, some touch sensitive surfaces may not include backlighting. Where this is the case, steps 1114 and 1115 may be omitted. Where backlighting is included, the backlighting can be configured and activated, as appropriate, at step 1115.

Each of steps 1110, 1111, 1112, 1113, 1114, and 1115 can be based upon one or more user preferences corresponding to one or more of a type of user input attachment, and/or the placement location of the user input attachment. For example, placement of a particular type of user input attachment in a particular location on the touch-sensitive surface may automatically reconfigure new input and output regions, launch a particular software application, and even set predetermined gains and threshold values (e.g., changing from finger-touch input to stylus input).

Decision 1192 determines whether a valid input for the accessory operational mode has occurred. Note that different types of input (e.g., conductive pad, touch, stylus) may be valid (or invalid) for different input regions depending on the configurations. If a valid input is detected, step 1193 reports the interaction event to the controller, which makes the appropriate response within the electronic device, and step 1110 returns to step 1192 for further inputs.

A non-standard input causes the flow to turn to decision 1117, which specifically determines if the input reflects a removal of the user input attachment. Because the system was earlier configured in step 1110 to cancel out any residual electromagnetic field disturbance caused by the temporal signature signal, removal of the attachment would essentially cause an "inverted signature signal" to be received by the controller and rotating or sliding the user input attachment (without full removal) would also create a variant of the inverted signature signal. If the user input attachment is determined to be removed, the flow returns to step 1101 and the controller resets the electronic device to the default input (and output) mode.

If the user input attachment has not been removed, it is possible that it has been translated across the touch sensitive surface to a new location. Where this is the case, the method 1100 returns to step 1191 to re-assess the location of the user input attachment. Thus, if the controller determines that the user input attachment has not been removed, but has only been moved, the flow returns to step 1191 to determine the new placement of the user input attachment and reconfigure the input and output parameters. Finally, if the controller determines that the user input attachment has not shifted, the controller assumes an error has occurred and the flow returns to step 1192 to await further user inputs.

Figure 12:
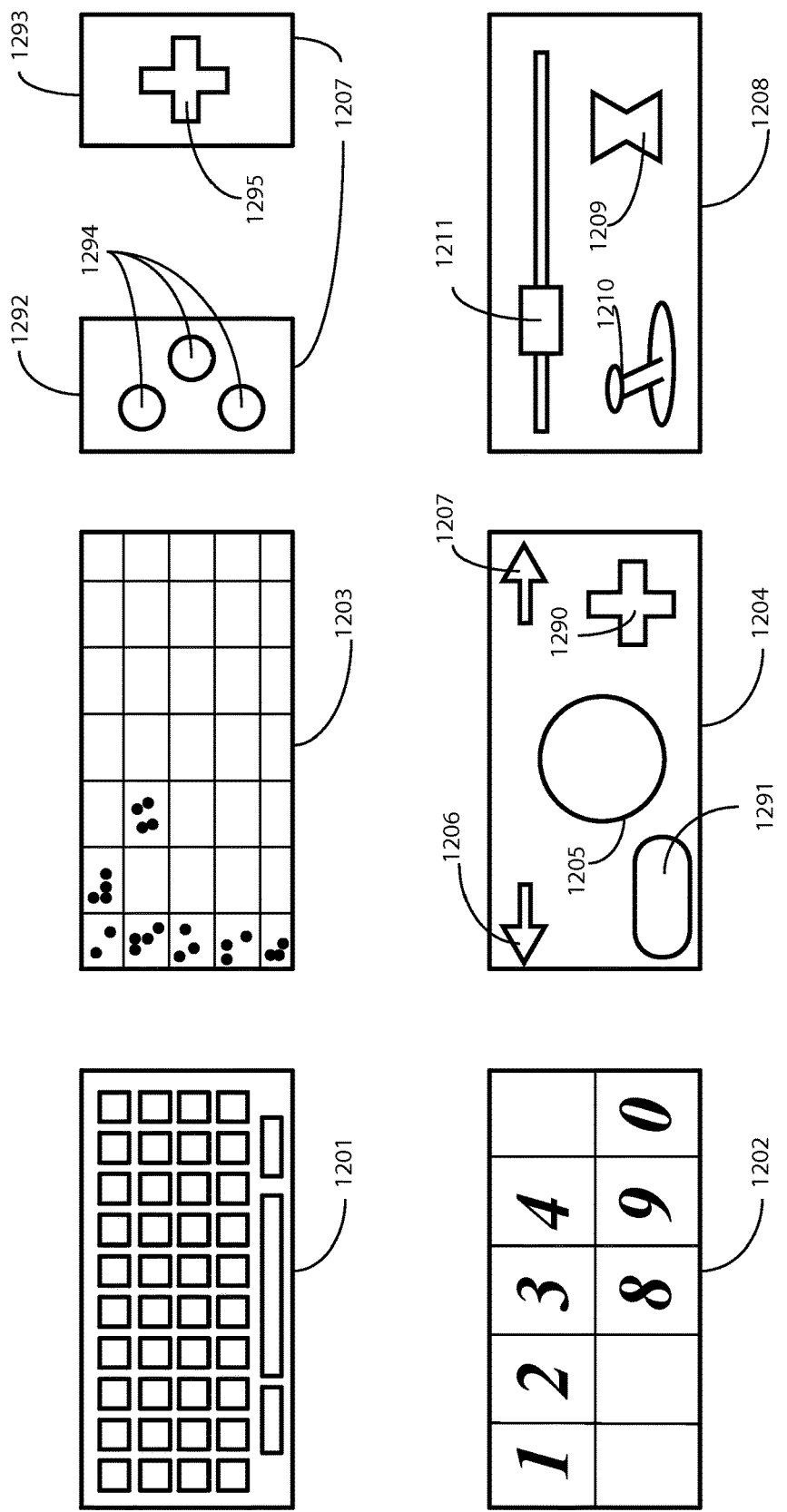
FIG. 12 illustrates different configurations of various user input attachments in accordance with embodiments of the invention.

Turning now to FIG. 12, the drawings show just a few of the possible configurations of user input attachments that may be created in accordance with embodiments of the invention. Each variation of FIG. 12 includes a user input attachment having various user actuation components thereon. It will be obvious to those of ordinary skill in the art having the benefit of this disclosure that the embodiments of FIG. 12 are illustrative only, and that others may be created without departing from the spirit and scope of the invention.

Embodiment 1201 is a configured as a QWERTY keypad. A full QWERTY keypad can be implemented. Alternatively, variations or subsets of keys from a QWERTY keypad can be implemented to save space. Alternatively, multiple languages can be supported by dedicated user input attachments as previously described.

Embodiment 1202 is a large numeric keypad, with each key being a large number for easy visibility. In the illustrative embodiment of FIG. 12, the large numeric keypad is that of a telephone dialing keypad. Other variants of large numeric keypads may also be created including a standard Bell keypad with the 4×3 matrix structure and the * and # keys.

Embodiment 1203 is a Braille keypad for the visually impaired. Braille keypads can be configured as QWERTY keypads, telephone keypads, or other variants.

Embodiment 1204 is an application specific keypad. It includes features such as a navigational wheel 1205, page back/forward keys 1206, 1207, an enter key 1291, and a D-pad 1290.

Embodiment 1207 is a game controller attachment that is configured in two pieces 1292, 1293. Each piece can be attached to a touch sensitive surface (or two different touch-sensitive surfaces) at distal ends of an electronic device to simulate a conventional game controller. As shown, one piece 1292 includes buttons 1294 and the other piece 1293 includes a D-pad 1295. If the pieces 1292, 1293 are configured as sleeves (open on both the left and right edges), it is possible for a user to attach the pieces 1292, 1293 to the electronic device in either a right-handed configuration (as shown) or a left-handed configuration (with piece 1293 to the left and piece 1292 to the right). In such an embodiment, the electronic device can recognize how the pieces are attached and the user preferences can automatically select the proper configuration (e.g., right-handed or left-handed).

Embodiment 1208 is a multifunction keypad illustrating some of the varied controls that can be included with user input attachments configured in accordance with embodiments of the invention. Such controls include sliders 1211, rockers 1209, and joysticks 1210.

Figure 13:
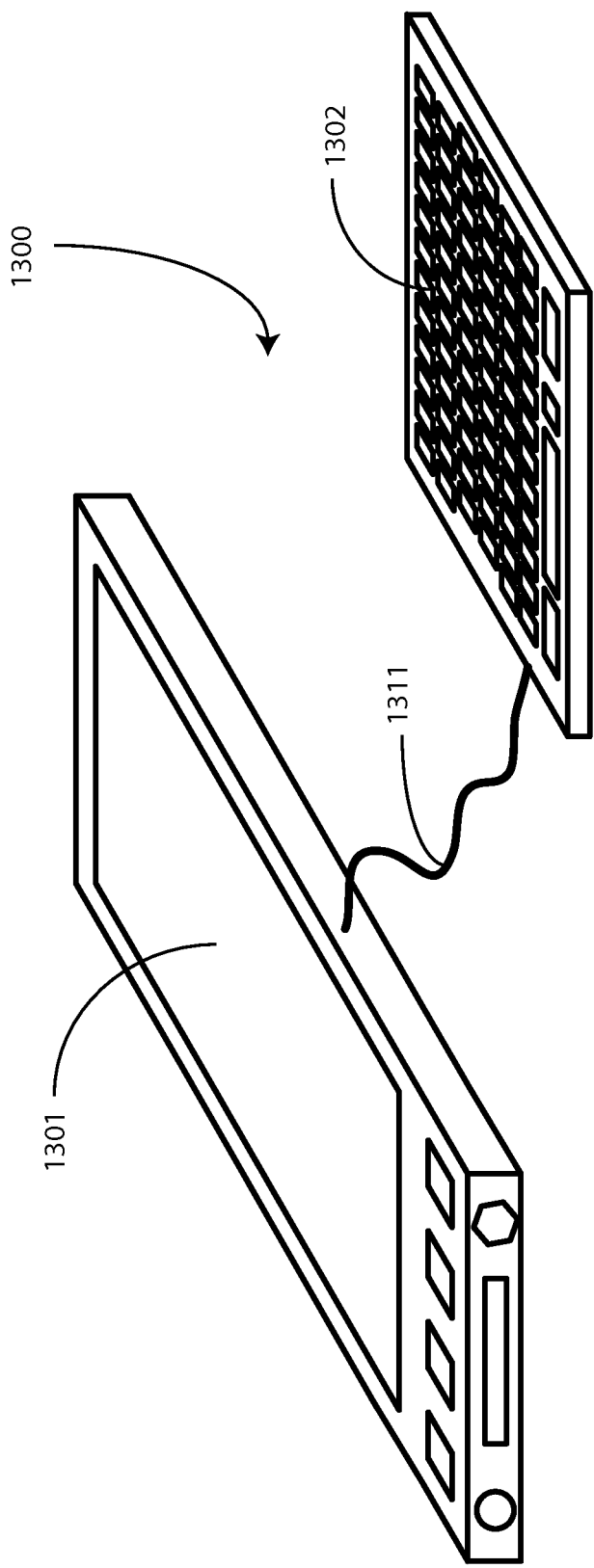
FIG. 13 illustrates one mechanical coupling suitable for use between an electronic device and a user input attachment in accordance with embodiments of the invention.

FIG. 13 illustrates one embodiment for an electronic device 1300 with user input attachment 1302 pair having a mechanical coupling that works to prevent accidental loss of the user input accessory 1302 when detached from a touch surface. Specifically, in FIG. 13, a lanyard 1311 serves as the mechanical coupling. The lanyard 1311, which may be manufactured from a springy elastic-type material, ensures the user input attachment 1302 remains physically coupled to the electronic device 1300 when detached from a touch sensitive display 1301. In one embodiment, the lanyard 1311 is a mechanical device only, and includes no electrical connections between the electronic device and the user input accessory 1302. Note that the lanyard 1131 allows for freedom to place the user input attachment in various locations against the touch sensitive display 1301 almost without restriction.

Turning now to FIGS. 14-17, the drawings show another mechanical coupling that works to prevent accidental loss of the user input attachment 1402 when detached from the touch sensitive surface, which in this embodiment is a touch sensitive display 1401. The embodiment of FIGS. 14-16 permits permanent attachment of the user input attachment 1402 to the housing of the electronic device while permitting selective detachability from the touch sensitive surface. This particular embodiment supports attachment in various locations along the touch sensitive surface, but with variability limited to the y axis. Attachment is optional. In some implementations shown above, the user input attachment 1402 may be completely detached from the electronic device as well.

Figure 16:
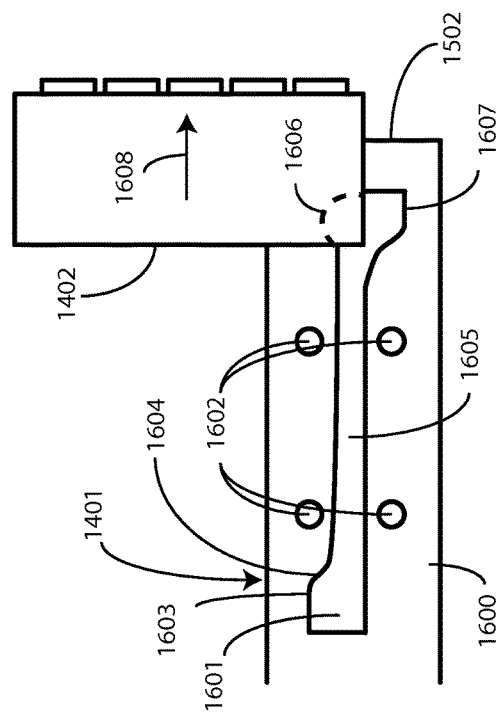

As shown in FIG. 16, the body of the electronic device 1600 is fitted with a groove 1601 and one or more attachment detents 1602. In this embodiment, the groove and detents are mirrored on the opposing housing (not shown) of the electronic device. The user input attachment 1402 includes complementary mechanical features for fitting within the groove 1601 and attachment detents 1602. For example, the attachment detents 1602 may be fitted with spring-loaded posts that seat within the one or more attachment detents 1602. Alternatively, magnetic couplings may replace the attachment detents 1602, with complementarily polarized magnetic couplings placed on the user input attachment 1402.

The groove 1601 includes, in this illustrative embodiment, several contours that permit the user input attachment 1402 to slide and rotate relative to the electronic device 1600. A standby catch 1603 retains the user input attachment 1402 when the attachment is not coupled to the touch sensitive display 1401. A transition contour 1604 provides a smooth transitional surface when initially moving the user input attachment 1402 towards coupling with the touch sensitive display 1401.

An elongated groove portion 1605 permits the user input attachment 1402 to slide longitudinally (along the y axis) relative to the electronic device 1600. A rotational recess 1606 permits rotation of the user input attachment 1402 about an end of the electronic device 1600. A second standby catch 1607 also helps to retain the user input attachment 1402 when not coupled to the touch sensitive display.

Figure 14:
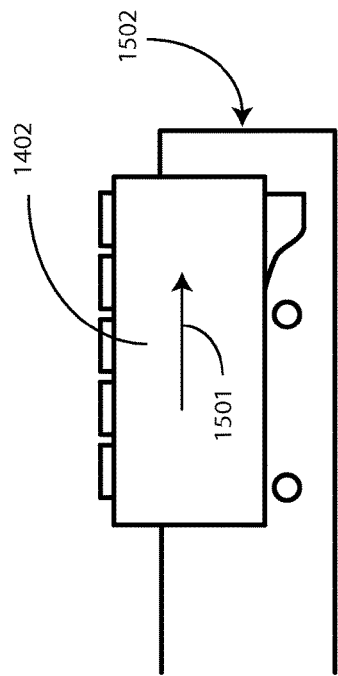
FIGS. 14-17 illustrate another mechanical coupling suitable for use with an electronic device and user input attachment in accordance with embodiments of the invention.
Figure 15:
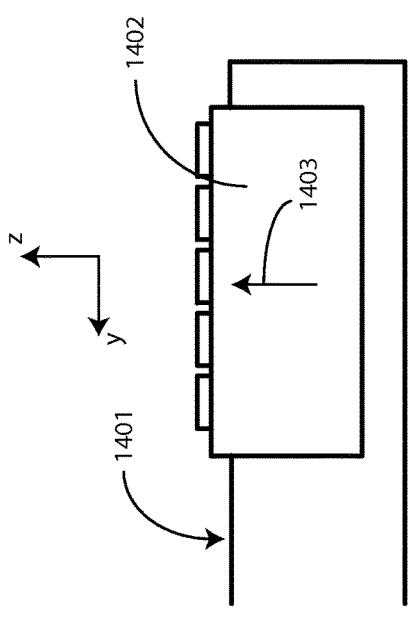
Figure 17:
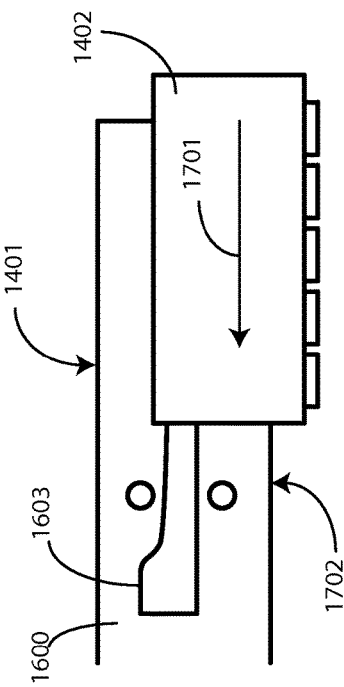

To illustrate the motion of this particular mechanical coupling, turn first to FIG. 14 which shows the user input attachment 1402 coupled to the touch sensitive display 1401. To decouple the user input attachment 1402 from the touch-sensitive surface, a user first lifts the user input accessory in the positive z-axis direction 1403, thereby separating the conductive pads from the touch sensitive display 1401. Then, as shown in FIG. 15, the user slides the user input attachment 1402 laterally in negative y-axis direction 1501 towards the end 1502 of the electronic device.

At FIG. 16, the user rotates the user input attachment 1402 about the end 1502 of the electronic device 1600 in direction 1608. At FIG. 17, the user input attachment 1402 can be slid in positive y-axis direction 1701. After positive mechanical features (not shown) projecting from the user input attachment 1402 seat within standby catch 1603, the user input attachment 1402 is then held against the back 1702 of the electronic device 1600, thereby leaving the touch sensitive display 1401 completely accessible by the user.

Figure 18:
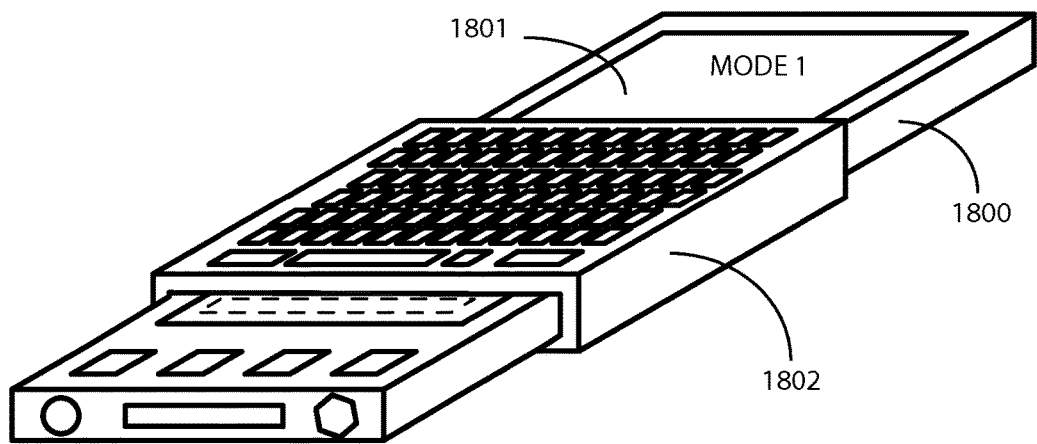
FIGS. 18-19 illustrate a change or adaptation of operational mode, based upon placement or point of contact between a user input attachment and an electronic device, in accordance with embodiments of the invention.
Figure 19:
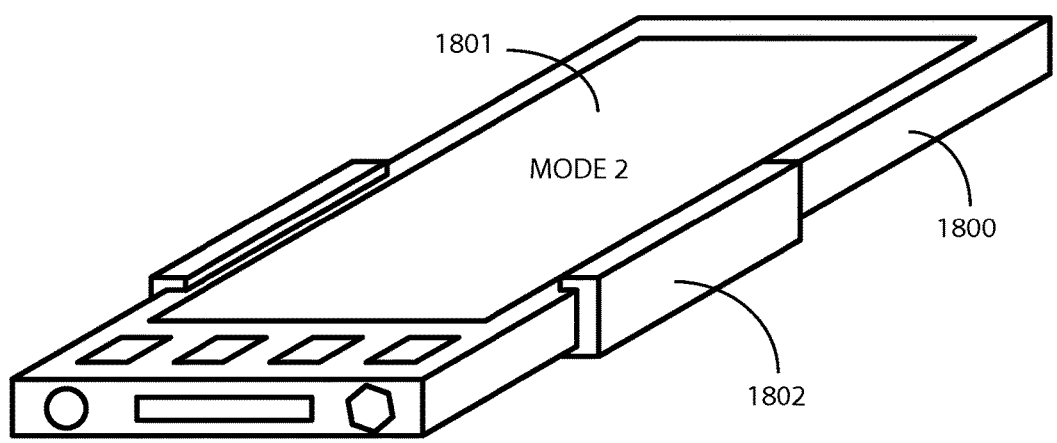

Turning now to FIGS. 18-19, these drawings show one embodiment of a mode alteration configuration for an electronic device 1800 operable with a user input attachment 1802 in accordance with embodiments of the invention. As noted above, the electronic device 1800 can be configured to change operational modes, sometimes in accordance with user preferences or profiles stored in memory, when the user input attachment 1802 is attached. FIGS. 18-19 illustrated such a mode change that corresponds with the location of the user input attachment 1802. Specifically, as shown in these figures, the first mode of operation can be enabled when the user input attachment 1802 is coupled to the touch sensitive display 1801. The second mode of operation can be enabled when the user input attachment 1802 is decoupled from the touch-sensitive display 1801.

In FIGS. 18-19, the user input attachment 1802 is configured to be attachable either along the touch sensitive display 1801 or along a portion of the electronic device 1800 other than the touch sensitive display 1801. Specifically, in this illustrative embodiment, the user input attachment 1802 can be coupled to the touch sensitive display 1801 as shown in FIG. 18, or alternatively to the rear of the electronic device 1800 as shown in FIG. 19. This configuration can be achieved with mechanical couplings such as those shown in FIG. 1 or FIGS. 14-17.

When the user input attachment 1802 is coupled to the touch sensitive display 1801, as shown in FIG. 18, the electronic device 1800 is configured to be operational in a first mode. When the user input attachment 1802 is coupled to the rear of the device, as shown in FIG. 19, the electronic device 1800 is configured to be operational in a second mode. Illustrating by way of example, where the user input attachment 1802 is configured as a QWERTY keypad, the first mode may be that of an email application where the QWERTY keypad is suitable for entering text into emails. The second mode, actuated when the user input attachment 1802 is detached, may be a photography application configured to present photographic images. Such a mode would be suitable for use of the full touch sensitive display 1801.

FIGS. 20-28 illustrate various mechanical configurations and constructs for user input attachments configured in accordance with embodiments of the invention. It will be obvious to those of ordinary skill in the art having the benefit of this disclosure that the embodiments of FIGS. 20-28 are illustrative purposes only, and that others may be created without departing from the spirit and scope of the invention. Although each key shown in FIGS. 20-28 is associated with a separate conductive pad, this is not necessary. Various embodiments may use fewer conductive pads than keys, in which case the keys are multiplexed to one or more of the conductive pads. (See FIGS. 31-32 for an example of such an embodiment.)

Figure 20:
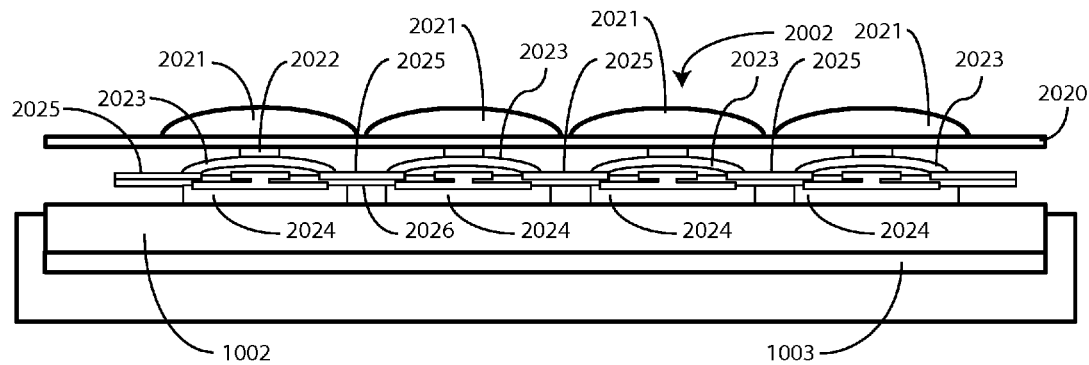
FIGS. 20-28 illustrate exemplary mechanical sectional views suitable for use in user input attachments configured in accordance with embodiments of the invention.

Beginning with FIG. 20, the user input accessory 2002 is coupled to the cover layer 1002 of an electronic device. The cover layer 1002 is disposed above the electromagnetic field sensor 1003. The cover layer 1002 can be made of glass, thermoplastic materials, or other similar materials. The cover layer 1002 is disposed above a electromagnetic field sensor 1003.

The user input accessory 2002 is configured within a compliant upper layer 2020 with integrated geometrically shaped keys 2021, which may resemble domes or other geometric structures. Each key 2021 includes a mechanical support 2022 that is connected to an electrically conductive popple dome 2023 spanning a conductive pad 2024 implemented using a carbon elastometric pad. When a user depresses the shaped key 2021, the popple dome 2023 collapses to connect conductive elements 2025 disposed on a printed circuit board 2026 with the conductive pad 2024. This alters the electric field sensed by the electromagnetic field sensors of the electromagnetic field sensor 1003, thereby providing an actuation signal to the electronic device.

Figure 21:
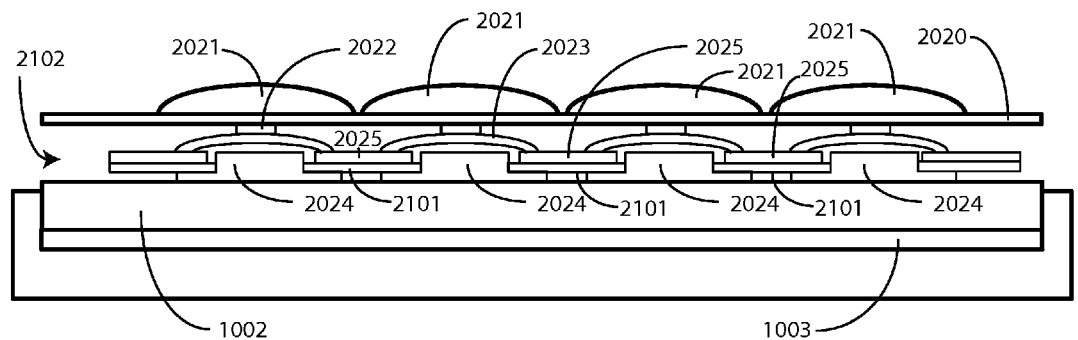

FIG. 21 illustrates an alternate mechanical configuration. FIG. 21 is similar to FIG. 20 in function. Specifically, the user input accessory 2102 is coupled to the cover layer 1002 of an electronic device. The cover layer 1002 is disposed above an electromagnetic field sensor 1003.

As with FIG. 20, the user input accessory 2102 is configured within a compliant upper layer 2020 having integrated domed shape keys 2021. Each key 2021 includes a mechanical support 2022 that is connected to a conductive popple dome 2023 spanning a conductive pad 2024 implemented as a carbon elastomeric pad. In FIG. 21, rather than using a printed circuit board as in FIG. 20, insulator film 2101 supports the conductive elements 2025. When a user depresses the dome shaped key 2021, the popple dome 2023 connects the conductive elements 2025 with the conductive pad 2024. This alters the electric field sensed by the electromagnetic field sensor 1003, thereby providing an actuation signal to the electronic device.

Figure 22:
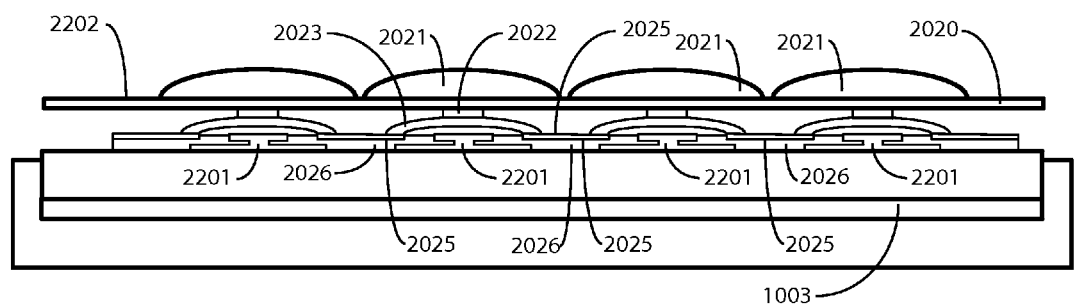

FIG. 22 illustrates an alternate mechanical configuration. FIG. 22 is essentially the same as FIG. 21, except for the fact that the conductive pads of FIG. 21 have been implemented with conductive layers 2201, such as conductive traces or similar conductive materials, disposed on the rear side of the printed circuit board 2026.

As with FIG. 20, the user input attachment 2202 is configured within a compliant upper layer 2020 having integrated domed shape keys 2021. Each key 2021 includes a mechanical support 2022 that is connected to a conductive popple dome 2023 spanning the conductive layer 2201.

A user actuates a key by depressing the dome shaped key 2021, thereby causing the popple dome 2023 to connect the conductive elements 2025 with the conductive layer 2201. This alters the electric field sensed by the electromagnetic field sensor 1003, thereby providing an actuation signal to the electronic device.

Figure 23:
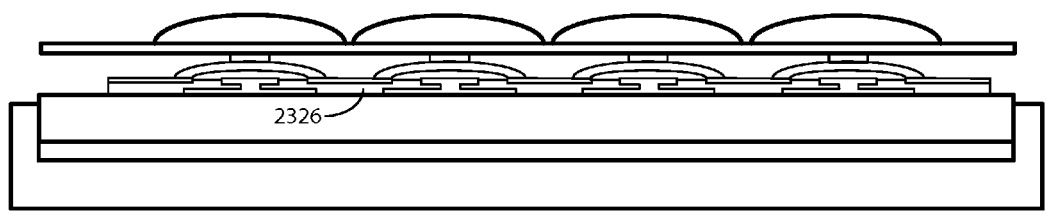

FIG. 23 shows an alternate mechanical configuration. FIG. 23 is the same as FIG. 22, except for the fact that the printed circuit board (2026) of FIG. 22 has been substituted with a flexible circuit board 2326. Note that while the printed circuit board (2026) has been replaced with a flexible circuit board 2326 for the purposes of illustration, it could equally be replaced with other conductive trace susbstrates, including dot matrix circuit boards, P dot circuit boards, Indium-tin oxide on substrate boards, and so forth.

Figure 24:
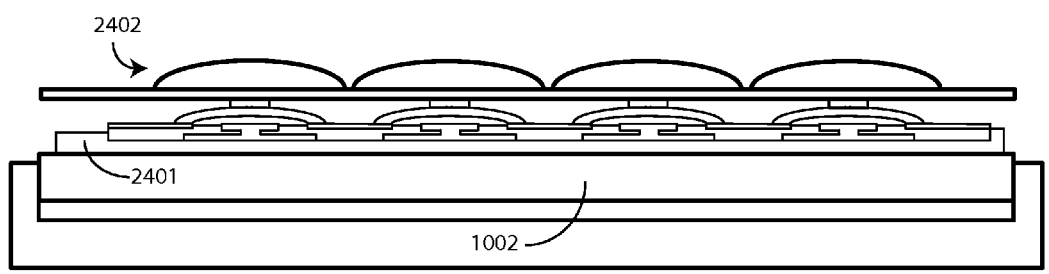

Turning now to FIG. 24, this drawing shows an alternate mechanical configuration. FIG. 24 is the same as FIG. 22, except for the fact that a plastic overmold layer 2401 has been disposed beneath the user input attachment 2402. The plastic overmold layer 2401 can help to facilitate static coupling to the cover layer 1002 of the touch sensitive display and can help to protect the individual conductive pads from damage.

Figure 25:
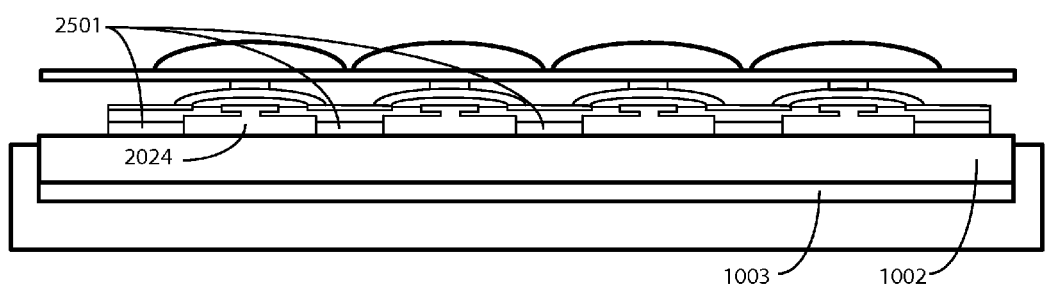

FIG. 25 illustrates an alternate mechanical configuration. FIG. 25 is the same as FIG. 24, except for the fact that the conductive pads 2024 have been interspaced along and integrated with the mechanical overmold layer 2501. This configuration facilitates enhanced signal delivery to the electromagnetic field sensor 1003 while still providing suitable static coupling to the cover layer 1002.

Figure 26:
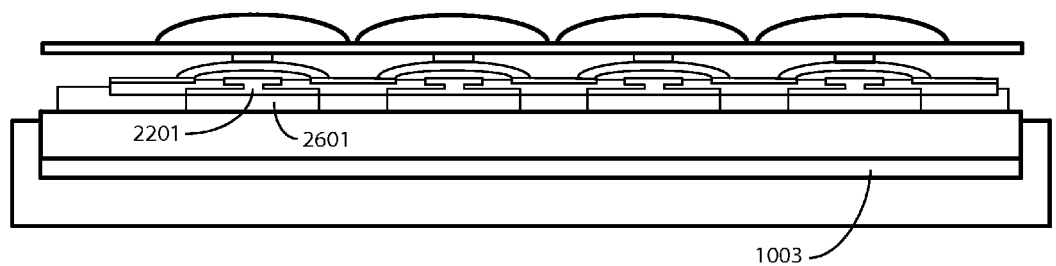

FIG. 26 illustrates an alternate mechanical configuration. FIG. 26 is the same as FIG. 25, except for the fact that the conductive pads (2024) have been replaced with voids 2601 leaving electrical contacts exposed above the electromagnetic field sensor 1003. Thus, the electrical contacts 2201 become the conductive pads that disrupt the electromagnetic field of the touch-sensitive surface and provide signals to the electronic device.

Figure 27:
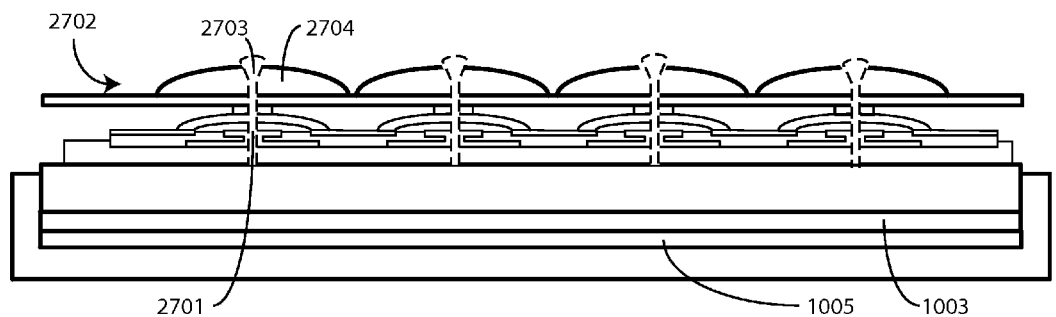

FIG. 27 illustrates a mechanical configuration designed to transmit light from an electroluminescent layer 1005 disposed beneath the electromagnetic field sensor 1003 through each key. In FIG. 27, the user input attachment 2702 is configured with one or more light carrying elements configured to permit light from the electroluminescent layer 1005 to pass therethrough.

The electroluminescent layer 1005 can include a layer of backlight material sandwiched between a transparent substrate bearing transparent electrodes on the top and bottom. The electrodes, which may be segmented and patterned, can be actuated individually by way of an actuation electrode and a ground electrode. The actuation electrodes can be manufactured from indium tin oxide, while the ground electrode may comprise a solid conductive ink layer printed on the bottom surface of the electroluminescent material.

Alternatively, the ground electrode may be patterned as well. Where the electroluminescent layer 1005 includes individually actuatable elements, the elements may be selectively disabled beneath the user input attachment 2702 to conserve power.

The electroluminescent layer 1005 can include a transflector layer. The transflector layer, which can be a semitransparent material configured to both reflect light and pass light, permits the operation of the display in a transflexive mode. An optional color layer may be included atop the electroluminescent layer 1005 having one or more colors. The color layer, which may also be a transflector having both transmission and reflection properties, may be used to color light coming from the electroluminescent layer 1005. The color layer may alternatively be made of color filters, which only have transmission properties.

The mechanical configuration of FIG. 27 is similar to that of FIG. 24, except for the fact that a compliant light pipe 2701 and light diffuser 2703 are included within each key. The compliant light pipe 2701 is compliant so that it will "give way" when the user actuates a key 2704. The compliant light pipe 2701 passes light from the electroluminescent layer 1005 through each key to provide a backlit effect. The optional light diffuser 2703 enables visibility of the backlit effect at wider angles than may otherwise occur using a light pipe alone.

Figure 28:
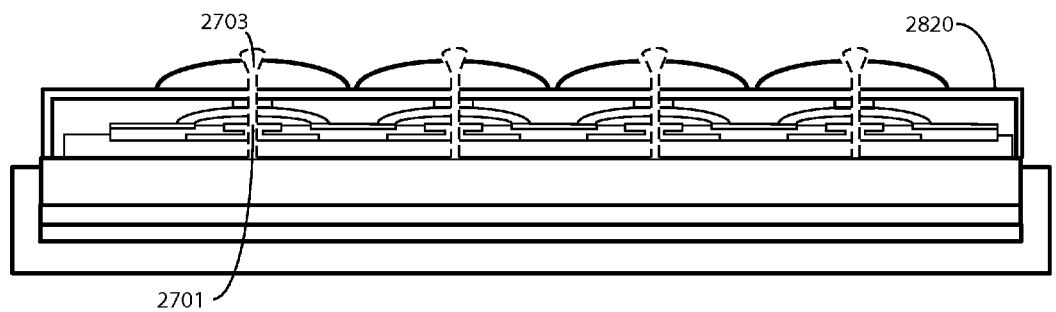

FIG. 28 illustrates another mechanical configuration. FIG. 28 is similar to FIG. 27, except for the fact that the compliant upper layer 2820 is configured as a light guide. Thus, in addition to a backlit effect being provided by the compliant light pipe 2701 and light diffuser 2703, areas about each key are also moderately illuminated by way of the compliant upper layer 2820. Such a configuration facilitates improved visibility in low-light conditions.

Figure 31:
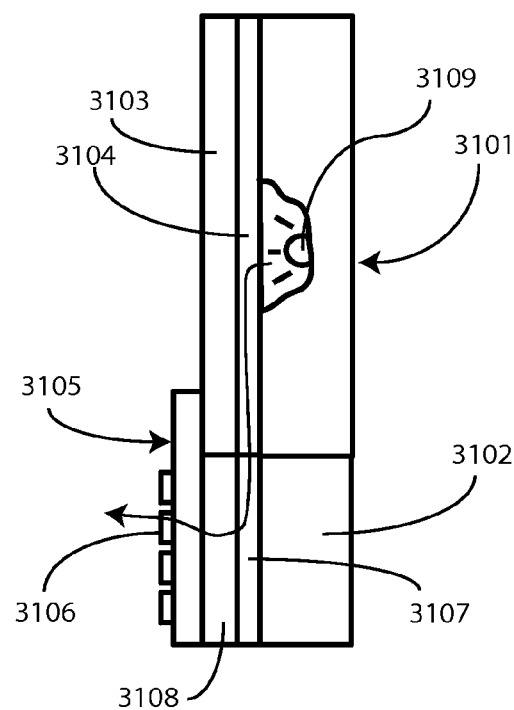
FIG. 31 illustrates one method of illuminating a user input accessory in accordance with embodiments of the invention.
Figure 32:
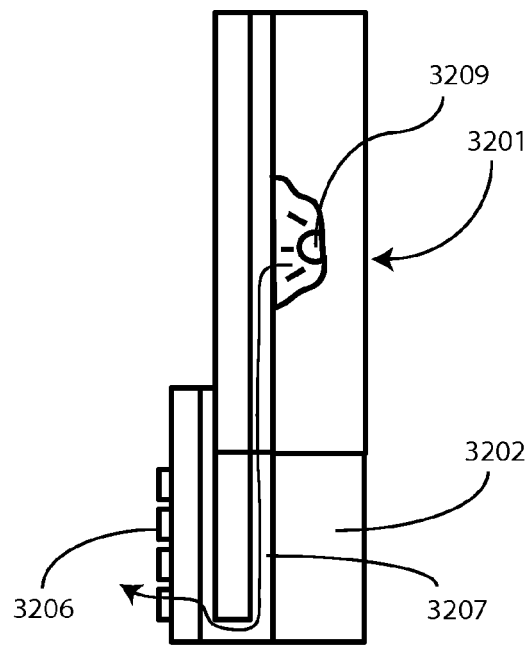
FIG. 32 illustrates one method of illuminating a user input accessory in accordance with embodiments of the invention.

The embodiments of FIGS. 27 and 28 are not the only way to deliver light from the electronic device through the user input attachment. In other embodiments electroluminescent elements can be illuminated at locations other than directly beneath the user input attachment. Turning now to FIGS. 31 and 32, illustrated therein are two such examples.

In FIG. 31, the electronic device 3101 includes a luminescent source 3109 therein. As previously described, the luminescent source 3109 is disposed beneath the touch sensitive display 3103 so as to project light through the touch sensitive display 3103 when active.

In the embodiment of FIG. 31, the user input attachment 3105 is coupled at the bottom of the electronic device 3101 with an overlap 3105 passing atop the touch sensitive display 3103. The overlap 3105 provides sufficient coverage for conductive pads thereunder (not shown) to deliver signals to the touch sensitive display 3103.

To deliver light from the luminescent source 3109 through the keys 3106 of the user input attachment 3102, a light pipe layer 3104 within the electronic device 3101 conveys light down a length of the light pipe layer 3104. In one embodiment, this occurs only when the user input attachment 3102 is coupled to the electronic device 3101 and is in use. The light is then delivered to a second light pipe layer 3107 in the user input attachment 3102, through a pellucid or transparent mechanical layer 3108, and through the keys 3106.

In FIG. 32, operation is similar except for the fact that the second light pipe layer 3207 passes about an end of the user input attachment 3202 to deliver light from the luminescent device 3209 in the electronic device 3201 through the keys 3206 of the user input attachment 3202. Note that the conductive pads of user input attachment 3102, 3202 would be placed on the underside of the overlap 3105 to contact the touch-sensitive display 3103. The keys 3106, 3206 could also be multiplexed to the conductive pads to support more keys than the number of conductive pads.

Figure 29:
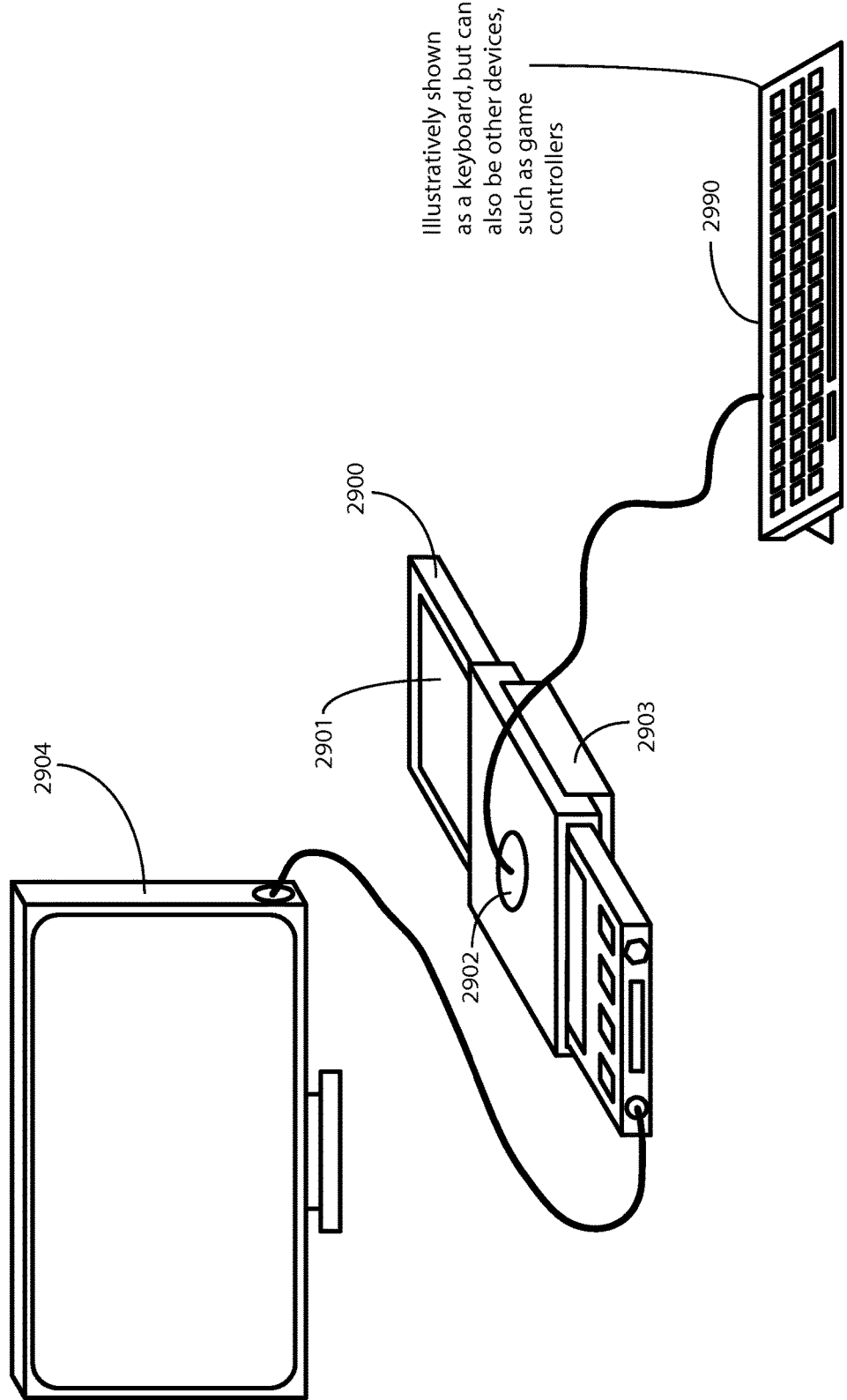
FIG. 29 illustrates one operational mode or application of use suitable for an electronic device operating with a sample user input attachment in accordance with embodiments of the invention.

To this point, embodiments of the present invention have been described as being self contained, i.e., an electronic device runs various applications and is optionally operable with a user input attachment that can be selectively coupled to a touch sensitive surface. However, it will be clear to those of ordinary skill in the art having the benefit of this disclosure that embodiments of the invention are not so limited. For example, embodiments of the present invention can be configured to work with other devices as well. FIG. 29 illustrates one such embodiment.

In FIG. 29, the electronic device 2900 is configured as an interface between a conventional input device 2990, shown here as a keyboard, and an auxiliary device 2904, shown here as a monitor. As such, the user input attachment 2902 works as a user control interface operable with the conventional input device 2990. The electronic device 2900 then delivers control signals from the conventional input device 2992 the auxiliary device 2904.

In this configuration, the user input attachment 2902 is configured as an adaptor for the conventional input device 2990. The user input attachment 2902 has been attached to a touch sensitive surface 2901 of the electronic device 2900. Thus, user actuation of the conventional input device 2990 is delivered through a cord to the user input attachment 2902. The user input attachment 2902 then delivers corresponding signals to the touch sensitive surface 2901. The electronic device 2900 then delivers the appropriate signals to the auxiliary device 2904.

Variations on this configuration can be created as well. For example, one simple variation would be to substitute other conventional input devices 2990 for the keyboard of FIG. 29. Gaming controllers, multimedia controllers, industrial devices intended for use in various environmental conditions, accessories for data collection and transfer, remote optical viewing devices, remote controls, and so forth may be so substituted. Also, more than one conventional input device may be coupled to the user input attachment.

Note also that in the illustrative embodiment of FIG. 29, no intelligence is required in either the auxiliary device 2904 or the conventional input device 2990. The intelligence of the electronic device 2900 can be used to run applications that take input from the conventional input device and deliver output to the auxiliary device. Additionally, the embodiment of FIG. 29 allows the use of preferred conventional input devices while maintaining a standardized interface through the electronic device 2900. Note that the touch sensitive surface 2901 may be disposed on various sides of the electronic device 2900. For example, the touch sensitive surface 2901 may be located on the front or sides of the electronic device. Further, a docking station 2903 may be provided for the electronic device 2900 while serving as an interface between the conventional input device 2990 and the auxiliary device 2904.

Figure 30:
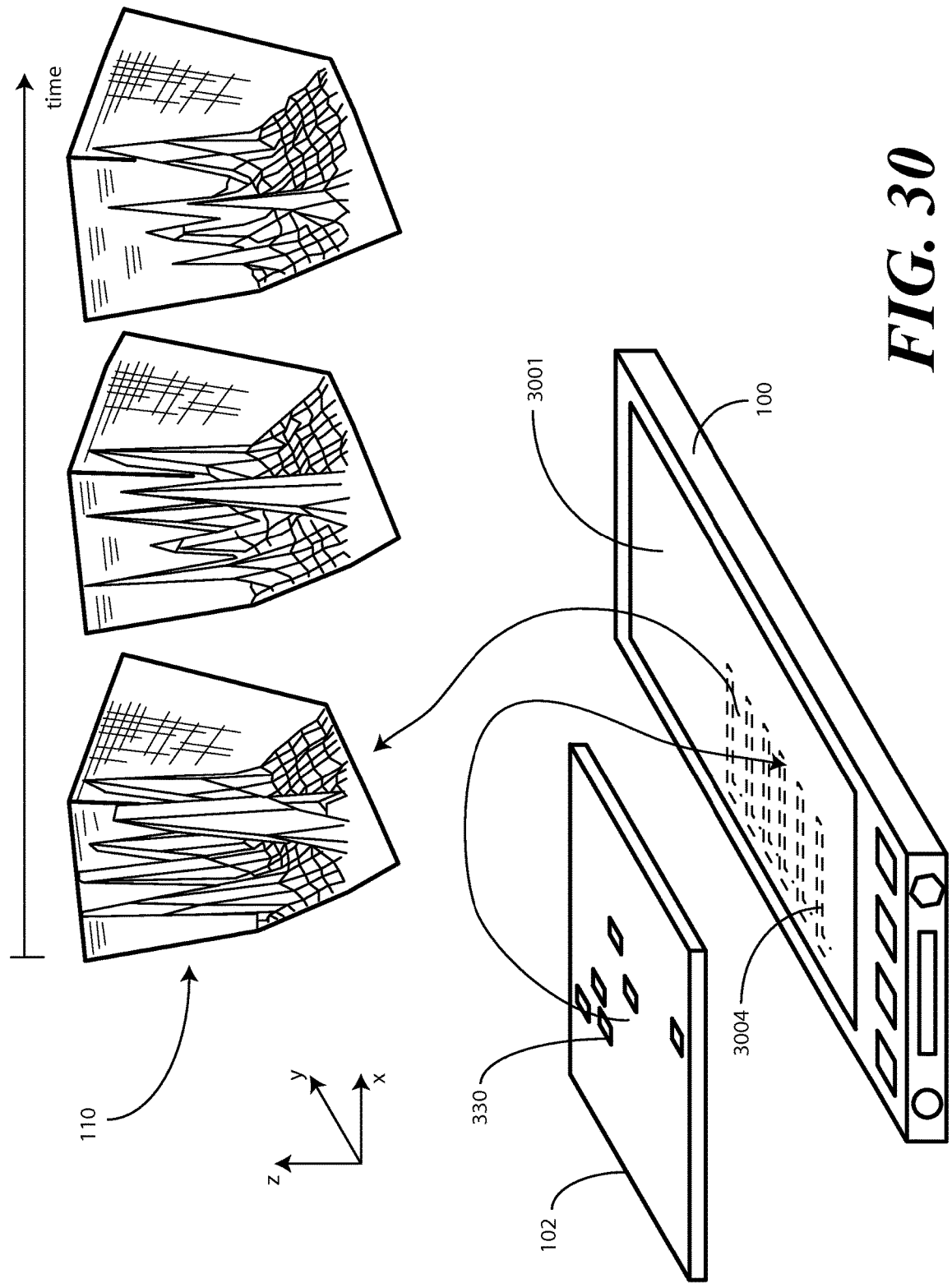
FIG. 30 illustrates one electronic device and one user input accessory, as well as a characteristic temporal signal delivered by the user input accessory to the electronic device through one or more conductive pads, in accordance with embodiments of the invention.

FIG. 30 provides a graphical depiction of how the conductive pads 330 interface with the electromagnetic field sensors 3004 of the touch sensitive surface 3001 to deliver the temporal signature signal 110 to the electronic device 100. When a conductive pad 330 is close enough to disrupt an electric field created by the electromagnetic field sensor 3004, this creates a signal that changes in time and that can be received by the electromagnetic field sensor 3004 and interpreted by a processor within the electronic device 100 as a touch event. This touch event appears electronically as the temporal signature signal 110, and has an associated amplitude and shape that change in time. As noted above, the signal can be analyzed to determine its "signature."

In one embodiment, viewing the temporal signature signal 110 mathematically, the processor is able to analyze all or sections of the signal profile to determine the signal surface area (on the x-y plane), signal shape (e.g., the number, location, and shape of each conductive pad), signal aspect ratio (on the x-y plane), or other geometrical (x-y plane) parameters corresponding to the temporal signature signal 110. As noted above, the signature can be used to identify the type of user input attachment 102 that is coupled to the touch sensitive display 3001.

Specifically, the temporal signature signal 110 can be a series of signal magnitudes spread along the surface of a display. These signal magnitudes can be configured to decay with the use of inductor-capacitor circuits disposed within the electronic device. In one embodiment, the identification module analyzes the temporal signature signal to identify the user input attachment by determining the area associated with the signal, the locations, shapes, and magnitudes of peaks, as well as the time-based decay of the peaks.

The resulting temporal characteristics can then be compared with predefined models, tolerances, or threshold limits to uniquely identify the type of user input attachment. The location of the temporal signature signal detected across the touch sensitive display can be a characteristic used to identify the attachment location and orientation of the user input attachment 102.

After the temporal characteristic has been detected, the controller within the electronic device may need to calibrate the corresponding signal out of the detectors in the touch sensitive surface. This cancels the residual signal so that subsequent field signals can be properly interpreted as actuation of keys or controls on the user input attachment.

After the user input attachment is removed, an inverted characteristic temporal signal can be detected by the controller. This inverted signal indicates removal of the user input attachment from the electronic device. Upon removal, the controller may again recalibrate the sensors to prepare to detect a subsequent attaching of the user input attachment or operate in default input mode (no user input attachment attached).

Figure 33:
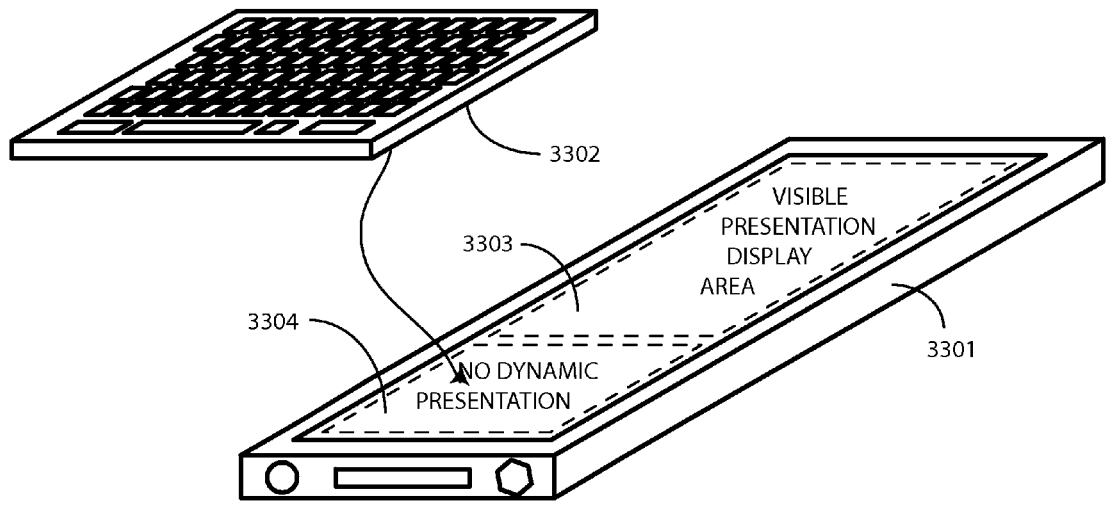
FIG. 33 illustrates a sample electronic device and a user input attachment in accordance with embodiments of the invention, where the sample electronic device includes visible portions of a touch sensitive display and portions of the display where dynamic data is not presented.

Turning now to FIG. 33, illustrated therein is another embodiment of an electronic device 3301 and user input attachment 3302 in accordance with embodiments of the invention. In FIG. 33, the display is segregated into a first region 3303 along which information is dynamically presented, and a second region 3304 along which no dynamic information is presented. By way of example, the second region 3304 may be a portion of the display that has several dedicated user actuation targets presented thereon that do not change with application. In one embodiment, the user input attachment 3302 can be configured to couple to the non-dynamic second region 3304 of the display such that the dynamic first region 3303 need not be reconfigured when the user input attachment 3302 is in use.

Figure 34:
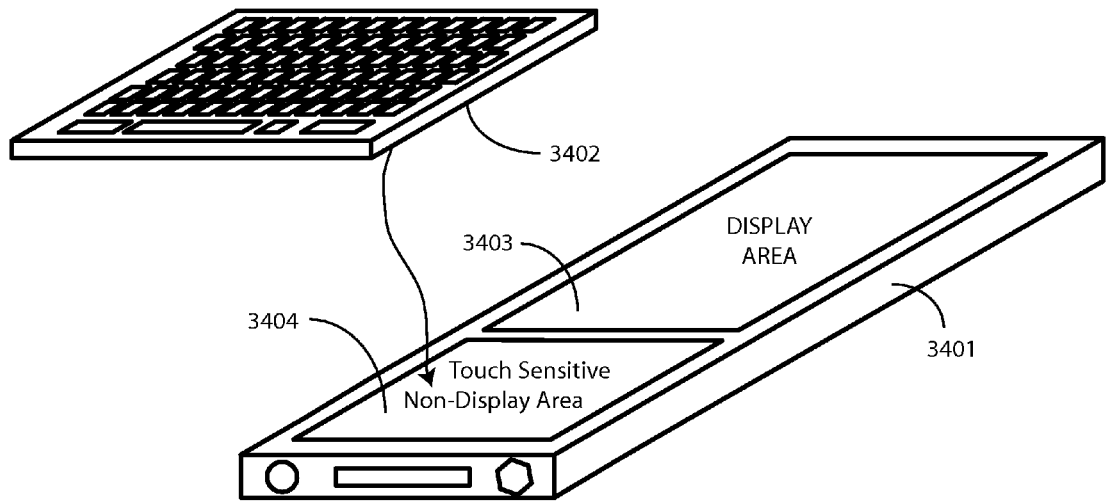
FIG. 34 illustrates a sample electronic device and a user input attachment in accordance with embodiments of the invention, where the sample electronic device includes touch sensitive areas other than those associated with the touch sensitive display.

Similarly, some electronic devices will have touch sensitive surfaces that are disposed in locations other than along the display. Turning now to FIG. 34, illustrated therein is one such embodiment. In FIG. 33, the display 3403 can be a touch sensitive display. Alternatively, it may be a dedicated display. Also, it may be only capacitive or electromagnetic sensor only as well, such as capacitive layers in flex circuit board, or printed circuit board. In such a configuration, no display or lens is needed which allows for manufacturing post-ponability.

A corresponding touch sensitive surface 3404 is provided for receiving touch input from a user. While shown on the top of the electronic device 3401, embodiments of the invention are not so limited. The touch sensitive surface 3404 could equally be on a side of the electronic device 3401, or on the rear side opposite the display 3403. In one embodiment, the user input attachment 3402 can be configured to couple to the touch sensitive surface 3404, as shown in FIG. 34, such that the display 3403 need not be reconfigured when the user input attachment 3402 is in use.

Figure 35:
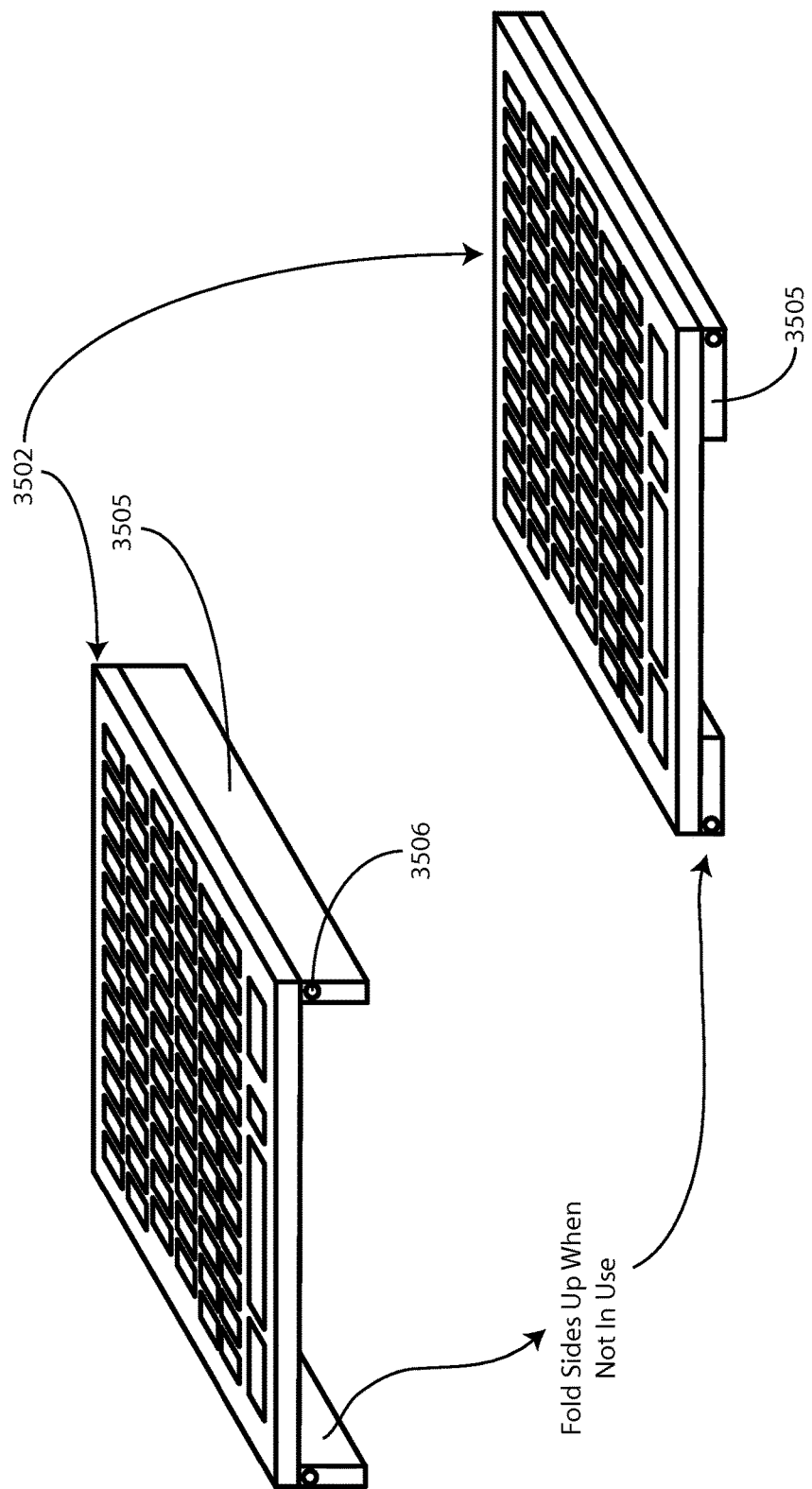
FIG. 35 illustrates one embodiment of a collapsible user input attachment configured in accordance with one embodiment of the invention.

Turning now to FIG. 35, illustrated therein is an alternate mechanical embodiment of a user input attachment 3502. In the embodiment of FIG. 35, the user input attachment 3502 includes mechanical side members 3505 for coupling to an electronic device. The mechanical side members 3505 are attached to the user input attachment 3502 by a hinge 3506 such that they can be folded when not in use. This user input attachment 3502 is therefore "collapsible."

It should be observed that in the embodiments described above, those embodiments reside primarily in combinations of method steps and apparatus components related to an electronic device having a detachable user input attachment, which may be configured as a keyboard, for entering data through a touch sensitive surface. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described above may be comprised of one or more conventional processors and unique stored program instructions that control the one or more processors to implement, in conjunction with certain non-processor circuits, some, most, or all of the functions of, for example, altering operating modes of the electronic device, receiving data from the user input attachment, identifying the user input attachment by its characteristic temporal signal, or controlling the electronic device as described herein.

The non-processor circuits may include, but are not limited to, a radio receiver, a radio transmitter, signal drivers, clock circuits, power source circuits, and user input devices. As such, these functions may be interpreted as steps of a method to perform the functions associated with accommodating a detachable user interface as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to the drawings above, like numbers indicate like parts throughout the views. As used in the description above and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A passive user input attachment for an electronic device having a touch sensitive surface, the passive user input attachment comprising:
    a plurality of conductive pads disposed along the passive user input attachment configured to deliver a temporal signature signal to the touch sensitive surface when the plurality of conductive pads are attached to the touch sensitive surface;
    one or more user actuation components disposed along the passive user input attachment, each user actuation component being configured to cause an electromagnetic field perturbation at the touch sensitive surface upon actuation of a user actuated component; and
    a mechanical coupling configured to retain the passive user input attachment against at least a portion of the touch sensitive surface.

2. The passive user input attachment of claim 1, wherein the mechanical coupling comprises arms extending distally from the passive user input attachment that are configured to wrap about the electronic device.

3. The passive user input attachment of claim 2, wherein the arms are collapsible.

4. The passive user input attachment of claim 1, wherein the passive user input attachment comprises a keypad portion and a personality piece, wherein the plurality of conductive pads are disposed along the keypad portion opposite the one or more user actuation components, further wherein the personality piece comprises the mechanical coupling.

5. The passive user input attachment of claim 1, wherein one or more of the plurality of conductive pads is coupled to one or more passive second order circuits comprising one or more of an inductor, a resistor, or a capacitor, wherein the one or more passive second order circuits is configured to cause the temporal signature signal.

6. The passive user input attachment of claim 4, wherein the keypad portion comprises at least one of:
    a QWERTY keypad;
    a Braille keypad;
    a numeric keypad;
    a game controller keypad;
    one or more slider controllers;
    one or more touch pads; or
    a navigational device.

7. The passive user input attachment of claim 1, wherein the mechanical coupling is configured to retain the passive user input attachment against either a first major face of the electronic device or a second major face of the electronic device.

8. The passive user input attachment of claim 1, wherein the mechanical coupling is configured as a sleeve.

9. The passive user input attachment of claim 1, wherein the mechanical coupling comprises one of a static charge coupling, a suction coupling, a magnetic attraction coupling, a gravity coupling, or combinations thereof.

10. The passive user input attachment of claim 1, wherein the passive user input attachment comprises a plurality of passive user input attachment elements, each being capable of attachment to the touch sensitive surface simultaneously.

11. The passive user input attachment of claim 10, wherein the plurality of passive user input attachment elements are configured to couple to distal ends of the electronic device to simulate a gaming controller.

12. The passive user input attachment of claim 1, wherein when the passive user input attachment is attached to the touch sensitive surface, the plurality of conductive pads are disposed atop at least the portion of the touch sensitive surface, wherein the one or more user actuation components are not disposed atop the touch sensitive surface.

13. An electronic device, comprising:
    a touch sensitive surface comprising an electromagnetic field sensor;
    a controller operable with the touch sensitive surface;
    a passive user input attachment, attachable to and removable from the touch sensitive surface, and configured to deliver a temporal signature signal to the touch sensitive surface when attached;
    an identification module, operable with the controller, and configured to identify the passive user input attachment from the temporal signature signal; and
    a retention device configured to maintain a physical connection between the passive user input attachment and the touch sensitive surface when the passive user input attachment is removed from the touch sensitive surface.

14. The electronic device of claim 13, wherein the retention device comprises one of a mechanical coupling or a lanyard.

15. The electronic device of claim 13, wherein the retention device comprises a groove and one or more attachment detents.

16. A user input attachment for an electronic device having a touch sensitive surface and one or more of an electroluminescent layer or light emitting diode backlight, the user input attachment comprising:
    a plurality of conductive pads disposed along the user input attachment configured to deliver a temporal signature signal to the touch sensitive surface when the plurality of conductive pads are attached to the touch sensitive surface;
    one or more user actuation components disposed along the user input attachment, each user actuation component being configured to cause an electromagnetic field perturbation at the touch sensitive surface through one or more of the plurality of conductive pads upon actuation of the user actuation component; and one or more light transport elements configured to pass light from the one or more of the electroluminescent layer or the light emitting diode backlight through the user input attachment.

17. The user input attachment of claim 16, wherein the one or more light transport elements comprise one or more light pipes disposed within the one or more user actuation components.

18. The user input attachment of claim 17, wherein the one or more user actuation components is configured as a popple dome, wherein the user input attachment comprises a mechanical support configured to connect one or more of the plurality of conductive pads with additional conductive elements.

19. The user input attachment of claim 16, wherein the one or more light transport elements comprise a light pipe layer passing beneath or over the one or more user actuation components.

20. The user input attachment of claim 19, wherein the light pipe layer passes about an end of the user input attachment.

* * * * *